United States Patent
Maeda

(10) Patent No.: US 8,831,112 B2
(45) Date of Patent: Sep. 9, 2014

(54) INFORMATION PROCESSING APPARATUS, ENCODING METHOD AND FRAME SYNCHRONIZATION METHOD

(75) Inventor: Takeshi Maeda, Tokyo (JP)

(73) Assignee: Sony Corporation, Tokyo (JP)

( * ) Notice: Subject to any disclaimer, the term of this patent is extended or adjusted under 35 U.S.C. 154(b) by 585 days.

(21) Appl. No.: 12/778,572

(22) Filed: May 12, 2010

(65) Prior Publication Data
US 2010/0296589 A1 Nov. 25, 2010

(30) Foreign Application Priority Data
May 19, 2009 (JP) ................................ P2009-120712

(51) Int. Cl.
*H04B 5/00* (2006.01)
(52) U.S. Cl.
USPC .......................................................... 375/257
(58) Field of Classification Search
USPC ......... 375/241, 242, 257, 282, 333, 337, 360, 375/361; 341/70, 71, 143
See application file for complete search history.

(56) References Cited

U.S. PATENT DOCUMENTS

| | | | |
|---|---|---|---|
| 5,742,135 A * | 4/1998 | Horst | 375/354 |
| 6,295,318 B1 * | 9/2001 | Wingard | 375/239 |
| 2009/0249107 A1 * | 10/2009 | Oku et al. | 713/400 |
| 2009/0268824 A1 * | 10/2009 | Fukuda | 375/244 |

FOREIGN PATENT DOCUMENTS

| | | |
|---|---|---|
| JP | 03-109843 | 5/1991 |
| JP | 2008-148221 | 6/2008 |

* cited by examiner

*Primary Examiner* — Young T. Tse
(74) *Attorney, Agent, or Firm* — Sony Corporation

(57) ABSTRACT

Provided is an information processing apparatus including a frame generator for generating a frame by adding, to data, a header indicating a beginning position of the data, an encoder for encoding the frame generated by the frame generator according to a specific coding scheme, and generating encoded data expressed by mutually different first and second-bits, a cycle changer for changing a coding cycle in a header section by controlling the encoder, and a line coding unit for performing line coding on the encoded data generated by the encoder, and generating an encoded signal which expresses the first-bit in a form of a plurality of first levels and the second-bit in a form of a plurality of second levels different from the first levels such that a same level does not occur consecutively and for which a polarity of the level is inverted every half cycle of a clock.

10 Claims, 13 Drawing Sheets

FIG. 7

| BIT SEQUENCE | | AFTER AMI CODING | | AFTER LINE CODING | | |
|---|---|---|---|---|---|---|
| Bit(T) | Bit(2T) | AMI(T) | AMI(2T) | ENC(T) | ENC(2T) | |
| 0 | 0 | 0 | 0 | 1.5 | -1.5 | |
| 0 | 1 | 0 | 1 | 1.5 | -0.5 | → PATTERN A |
| | | 0 | -1 | 1.5 | -2.5 | |
| 1 | 0 | 1 | 0 | 2.5 | -1.5 | |
| | | -1 | 0 | 0.5 | -1.5 | |
| 1 | 1 | 1 | -1 | 2.5 | -2.5 | |
| | | -1 | 1 | 0.5 | -0.5 | |
| N/A | | 1 | 1 | 2.5 | -0.5 | → PATTERN B |
| | | -1 | -1 | 0.5 | -2.5 | |

FIG. 11

| R(T) | R(2T) | $C_{+H}$ (t=T) | $C_{-H}$ (t=2T) | $C_{+L}$ (t=T) | $C_{-L}$ (t=2T) | |
|---|---|---|---|---|---|---|
| 2.5 | -2.5 | 1 | 1 | 1 | 1 | |
|  | -1.5 | 1 | 0 | 1 | 1 | |
|  | -0.5 | 1 | 0 | 1 | 0 | → PATTERN 1 |
| 1.5 | -2.5 | 0 | 1 | 1 | 1 | |
|  | -1.5 | 0 | 0 | 1 | 1 | |
|  | -0.5 | 0 | 0 | 1 | 0 | |
| 0.5 | -2.5 | 0 | 1 | 0 | 1 | → PATTERN 2 |
|  | -1.5 | 0 | 0 | 0 | 1 | |
|  | -0.5 | 0 | 0 | 0 | 0 | |

INFORMATION PROCESSING APPARATUS, ENCODING METHOD AND FRAME SYNCHRONIZATION METHOD

BACKGROUND OF THE INVENTION

1. Field of the Invention

The present invention relates to an information processing apparatus, an encoding method, and a frame synchronization method.

2. Description of the Related Art

Most information processing apparatuses such as mobile phone and notebook personal computer (hereinafter, a notebook PC) use a movable member for a hinge portion connecting a main body to be operated by a user and a display portion on which information is displayed. However, a large number of signal lines and power lines pass through the hinge portion, and a method for maintaining reliability of the wiring is desired. Reducing the number of the signal lines passing through the hinge portion comes first to mind. Therefore, data transmission processing between the main body and the display portion is made to be performed by using a serial transmission method instead of a parallel transmission method. When the serial transmission method is used, the number of signal lines is decreased, and furthermore, an effect that the electromagnetic interference (EMI) is decreased can be also obtained.

In the serial transmission method, data is encoded and then transmitted. At that time, for example, a Non Return to Zero (NRZ) encoding scheme, a Manchester encoding scheme, an Alternate Mark Inversion (AMI) encoding scheme, or the like is used as the coding scheme. For example, JP-A-1991-109843 discloses a technology for transmitting data by using an AMI code, which is a representative example of a bipolar code. The patent document also discloses a technology according to which a data clock is transmitted after being expressed by an intermediate value of a signal level, and the receiving side regenerates the data clock based on the signal level. Also, JP-A-2008-148221 discloses a technology of frame-synchronizing the signal transmitted from a serializer to a deserializer at the receiving side. Particularly, this patent document discloses a technology of transmitting a transmission frame after adding a synchronization code thereto, and to reduce the processing burden of the receiving side for synchronization establishment.

SUMMARY OF THE INVENTION

However, in an information processing apparatus such as a notebook PC, even if the serial transmission method using the above code is used, the number of signal lines wired in the hinge portion is still large. For example, in a case of a notebook PC, there are wiring lines related to an LED backlight for illuminating an LCD in addition to video signals to be transmitted to the display portion, and thus several tens of signal lines including these signal lines are wired in the hinge portion. The LCD is an abbreviation for Liquid Crystal Display, and the LED is an abbreviation for Light Emitting Diode.

In view of such issues, a coding scheme (hereinafter, new scheme) has been developed according to which a DC component is not included and according to which a clock component can be easily extracted from a received signal. Since a transmission signal generated based on this new scheme does not include a DC component, it can be transmitted by being superimposed on DC power. Furthermore, by detecting the polarity inversion cycle of the transmission signal, a clock can be regenerated by the receiving side without using a PLL. Therefore, a plurality of signal lines can be bound together, and thereby the number of signal lines can be reduced and also the power consumption and the circuit scale can be reduced. The PLL is an abbreviation for Phase Locked Loop.

Even when using a high-speed data transmission scheme using a multilevel code according to such new scheme, frame synchronization has to be established at the receiving side to correctly decode data. For example, JP-A-2008-148221 described above discloses a method of providing a synchronization code, such as a K code or a comma code, at the header portion added at the beginning of a frame and establishing frame synchronization at the receiving side by using the synchronization code. However, when using this method, the detection accuracy for the synchronization code will be dependent on the length of a known bit sequence in a header portion, and thus, false synchronization occurs unless the header potion is set to a sufficient length. For example, when the length of the known bit sequence is 8 bits, false synchronization occurs with the probability of $1/2^8 = 1/256$. In contrast, if the length of the known bit sequence is extended to reduce the probability of false synchronization, the proportion of a header portion in one frame increases and transmission efficiency is reduced.

In light of the foregoing, it is desirable to provide an information processing apparatus, an encoding method and a frame synchronization method which are novel and improved, and which enable to establish frame synchronization more surely without reducing transmission efficiency.

According to an embodiment of the present invention, there is provided an information processing apparatus which includes a frame generation unit for generating a transmission frame by adding, to transmission data, a header indicating a beginning position of the transmission data, an encoding unit for encoding the transmission frame generated by the frame generation unit according to a specific coding scheme, and generating encoded data expressed by mutually different first and second bit values, a cycle changing unit for changing a coding cycle in a header section by controlling the encoding unit, and a line coding unit for performing line coding on the encoded data generated by the encoding unit, and generating an encoded signal which expresses the first bit value in a form of a plurality of first amplitude levels and the second bit value in a form of a plurality of second amplitude levels different from the first amplitude levels such that a same amplitude level does not occur consecutively and for which a polarity of the amplitude level is inverted every half cycle of a clock.

Furthermore, the frame generation unit may be configured to generate a transmission frame by adding a header having a specific bit length to the transmission data regardless of a bit length of the transmission data.

Furthermore, the information processing apparatus may further include a signal transmitting unit for transmitting the encoded signal generated by the line coding unit, a signal receiving unit for receiving the encoded signal transmitted by the signal transmitting unit, an amplitude detection unit for detecting an amplitude level of the encoded signal received by the signal receiving unit, a coding rule violation detection unit for detecting an amplitude pattern corresponding to a coding rule violation under the specific coding scheme from the detection result by the amplitude detection unit, and a header detection unit for detecting the beginning position of the transmission data based on a position of the amplitude pattern detected by the coding rule violation detection unit.

Furthermore, the information processing apparatus may further include a decoding unit for generating decoded data from the detection result by the amplitude detection unit by performing a decoding process on the encoded signal based on a coding rule of the specific coding scheme, and a data extraction unit for extracting, from the decoded data generated by the decoding unit, data of a section corresponding to the transmission data by referring to the beginning position of the transmission data detected by the header detection unit.

Furthermore, the information processing apparatus may further include a serializer including the frame generation unit, the encoding unit, the cycle changing unit, the line coding unit and the signal transmitting unit, where parallel data is converted into serial data and transmitted to the encoding unit as the transmission data, where the encoded data generated by the encoding unit under a control of the cycle changing unit is input to the line coding unit, and where the encoded signal generated by the line coding unit is transmitted by the signal transmitting unit, and a deserializer connected with the serializer via a specific signal line and including the signal receiving unit, the amplitude detection unit, the coding rule violation detection unit, the header detection unit, the decoding unit and the data extraction unit, where a transmission signal transmitted through the specific signal line is received by the signal receiving unit, where an amplitude level is detected by the amplitude detection unit from the transmission signal received by the signal receiving unit, where a coding rule violation is detected by the coding rule violation detection unit based on the detection result, where decoded data is generated by the decoding unit, where the beginning position of the transmission data is detected by the header detection unit based on the detection result of the coding rule violation, where data corresponding to the transmission data is extracted from the decoded data by the data extraction unit by using the detection result, and where the data is parallelized and output.

Furthermore, the encoded data may be a bipolar code, an Alternate Mark Inversion (AMI) code with a duty of 100%, or a partial response code.

According to another embodiment of the present invention, there is provided an information processing apparatus which includes a header adding unit for adding a header indicating a beginning position of data to transmission data, an encoding unit for encoding the transmission data to which the header is added by the header adding unit, according to a specific coding scheme, and generating encoded data expressed by mutually different first and second bit values, a cycle changing unit for changing a coding cycle in a section of the header by controlling the encoding unit, and an encoded data transmitting unit for transmitting the encoded data generated by the encoding unit under a control of the cycle changing unit.

Furthermore, the information processing apparatus may further include an encoded data receiving unit for receiving the encoded data transmitted by the encoded data transmitting unit, a coding rule violation detection unit for detecting a coding rule violation under the specific coding scheme from the encoded data received by the encoded data receiving unit, and a header detection unit for detecting a position of the header based on a position of the coding rule violation detected by the coding rule violation detection unit.

According to another embodiment of the present invention, there is provided an encoding method including the steps of generating a transmission frame by adding, to transmission data, a header indicating a beginning position of the transmission data, encoding, while changing a coding cycle between a section of the header and a section of the transmission data, the transmission frame generated in the step of generating a transmission frame according to a specific coding scheme, and generating encoded data expressed by mutually different first and second bit values, and performing line coding on the encoded data generated in the step of encoding, and generating an encoded signal which expresses the first bit value in a form of a plurality of first amplitude levels and the second bit value in a form of a plurality of second amplitude levels different from the first amplitude levels such that a same amplitude level does not occur consecutively and for which a polarity of the amplitude level is inverted every half cycle of a clock.

According to another embodiment of the present invention, there is provided an encoding method including the steps of adding a header indicating a beginning position of data to transmission data, and encoding, according to a specific coding scheme, the transmission data to which the header is added in the step of adding a header while changing a coding cycle between a section of the header and a section of the transmission data, and generating encoded data expressed by mutually different first and second bit values.

According to another embodiment of the present invention, there is provided a frame synchronization method including the steps of adding a header indicating a beginning position of data to transmission data, encoding, according to a specific coding scheme, the transmission data to which the header is added in the step of adding a header while changing a coding cycle between a section of the header and a section of the transmission data, and generating encoded data expressed by mutually different first and second bit values, transmitting the encoded data generated in the step of encoding, receiving the encoded data transmitted in the step of transmitting, detecting a coding rule violation under the specific coding scheme from the encoded data received in the step of receiving, and detecting a position of the header based on a position of the coding rule violation detected in the step of detecting.

According to the embodiments of the present invention described above, frame synchronization can be established more surely without reducing transmission efficiency.

BRIEF DESCRIPTION OF THE DRAWINGS

FIG. 7 is an explanatory diagram showing an example of a line coding rule according to the present embodiment for which an AMI coding rule serves as a base;

FIG. 11 is an explanatory diagram showing an example of a method of detecting a synchronization pattern according to the present embodiment;

DETAILED DESCRIPTION OF THE EMBODIMENT(S)

Figure 1:
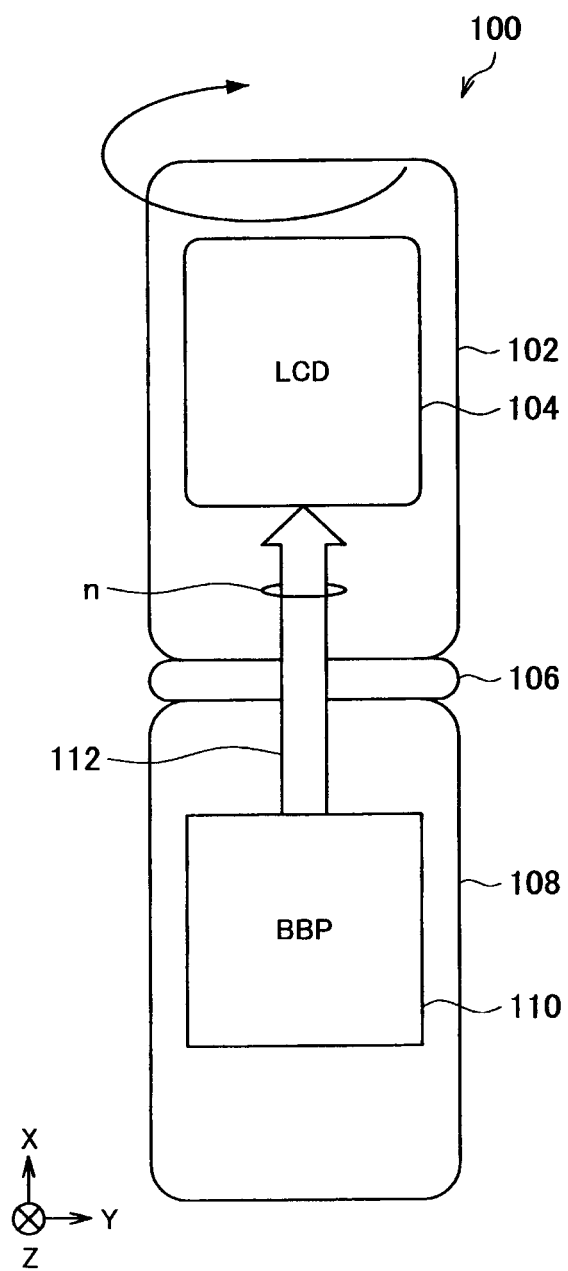
FIG. 1 is an explanatory diagram showing a configuration example of a mobile terminal adopting a parallel transmission scheme.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Description>

The flow of a description of an embodiment of the present invention described below will be briefly mentioned. First, a device configuration of a mobile terminal 100 adopting a parallel transmission scheme will be briefly described with reference to FIG. 1. Herein, a demerit relating to the parallel transmission scheme will be pointed out. Then, a device configuration of a mobile terminal 130 adopting a serial transmission scheme will be briefly described with reference to FIG. 2.

Then, a functional configuration of a mobile terminal 130 according to an embodiment of the present invention will be described with reference to FIG. 3. Herein, a line coding method according to the present embodiment will be described with reference to FIG. 4. Also, a function of a line coding unit 154 which is a structural element of the mobile terminal 130 according to the present embodiment will be described in detail with reference to FIG. 5. Furthermore, a method of encoding a synchronization code according to the present embodiment will be described with reference to FIGS. 6 and 7.

Figure 8:
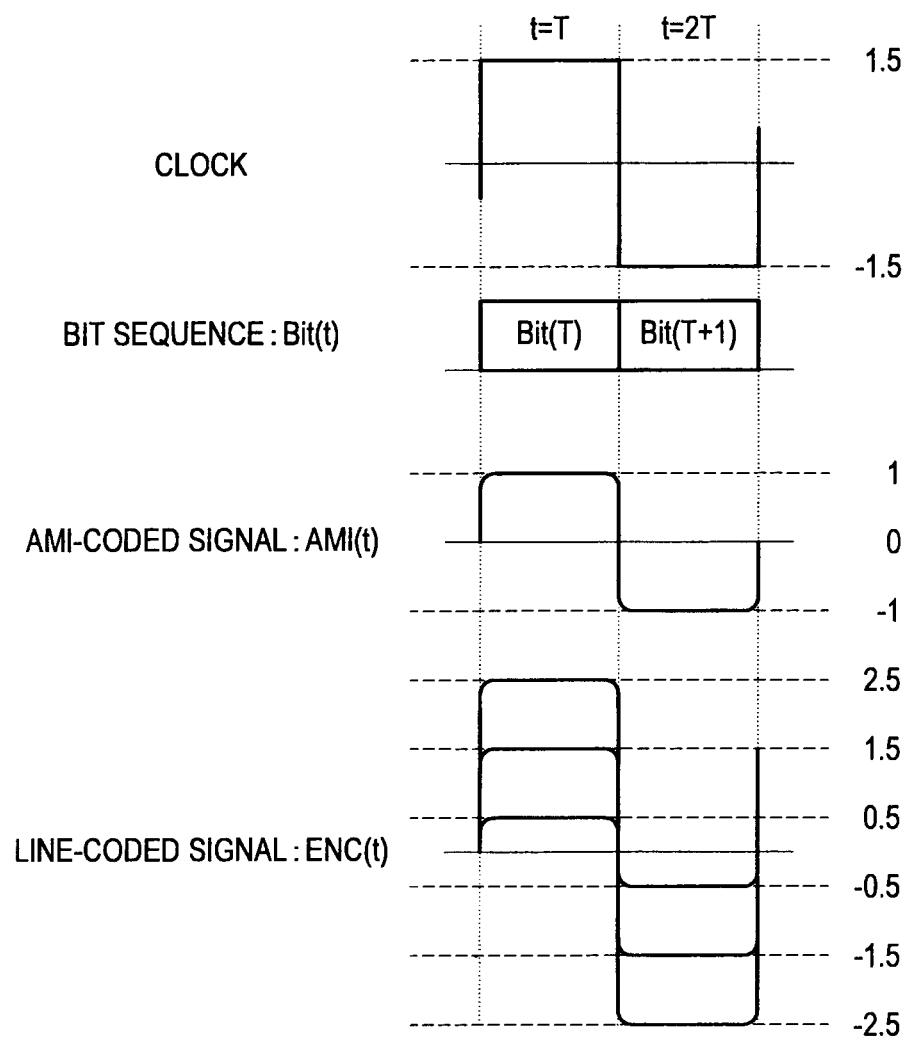
FIG. 8 is an explanatory diagram showing an example of the line coding method according to the present embodiment for which an AMI coding rule serves as a base.

Furthermore, a functional configuration of a line decoding unit 176 which is a structural element of the mobile terminal 130 according to the present embodiment will be described in detail with reference to FIGS. 8 and 9. Furthermore, a method of detecting a synchronization code according to the present embodiment will be described with reference to FIGS. 10 and 11. Then, a supplementary description will be given on the method of encoding a synchronization code according to the present embodiment by referring to a modified example, with reference to FIG. 12. Furthermore, a supplementary description will be given on the method of detecting a synchronization code according to the present embodiment by referring to a modified example, with reference to FIG. 13. Lastly, the technical idea of the embodiment will be summarized and operational effects obtained by the technical idea will be briefly described.

Description Items

1: Introduction
  1-1: Device Configuration of Mobile Terminal 100 Adopting Parallel Transmission Scheme
  1-2: Device Configuration of Mobile Terminal 130 Adopting Serial Transmission Scheme
2: Embodiment
  2-1: Functional Configuration of Mobile Terminal 130
    2-1-1: Overall Functional Configuration
    2-1-2: Detailed Functional Configuration of Transmitting Side
    2-1-3: Detailed Functional Configuration of Receiving Side
  2-2: Encoding Method
  2-3: Frame Synchronization Method
  2-4: Modified Example (Encoding Method, Frame Synchronization Method)
3: Conclusion 1: Introduction First, before describing in detail the technology according to an embodiment of the present invention, issues to be solved by the present embodiment will be briefly summarized.

(1-1: Device Configuration of Mobile Terminal 100 Adopting Parallel Transmission Scheme)

First, a device configuration of a mobile terminal 100 adopting a parallel transmission scheme will be briefly described with reference to FIG. 1. FIG. 1 is an explanatory diagram showing an example of the device configuration of the mobile terminal 100 adopting a parallel transmission scheme. In FIG. 1, a mobile phone is schematically illustrated as an example of the mobile terminal 100. However, the application scope of the technology described below is not limited to a mobile phone. For example, it can be applied to an information processing apparatus such as a notebook PC or various portable electronic devices.

As shown in FIG. 1, the mobile terminal 100 mainly includes a display unit 102, a liquid crystal unit 104 (LCD), a connecting unit 106, an operation unit 108, a baseband processor 110 (BBP), and a parallel signal path 112. The LCD is an abbreviation for Liquid Crystal Display. Additionally, the display unit 102 and the operation unit 108 may be respectively referred to as a display side and a main body side. Additionally, for the sake of explanation, a case where an image signal is transmitted through the parallel signal path 112 will be described as an example. Of course, the type of a signal to be transmitted through the parallel signal path 112 is not limited to such, and it may also be a control signal, an audio signal, or the like, for example.

As shown in FIG. 1, the liquid crystal unit 104 is provided on the display unit 102. The image signal transmitted through the parallel signal path 112 is input to the liquid crystal unit 104. The liquid crystal unit 104 displays an image based on the input image signal. Also, the connecting unit 106 is a member connecting the display unit 102 and the operation unit 108. The connecting member forming the connecting unit 106 has a structure that enables the display unit 102 to rotate 180 degrees in a Z-Y plane, for example. The connecting member can also be formed such that the display unit 102 can rotate in an X-Z plane. In this case, the mobile terminal 100 will have a structure capable of folding. Additionally, the connecting member may also have a structure that allows the display unit 102 to move freely in any direction.

The baseband processor 110 is a computational processing unit that provides the mobile terminal 100 with a communication control function and an application execution function. A parallel signal that is output from the baseband processor 110 is transmitted through the parallel signal path 112 to the liquid crystal unit 104 of the display unit 102. The parallel signal path 112 is provided with a plurality of signal lines. In the case of a mobile phone, for example, the number n of the signal lines is approximately fifty lines. The image signal transmission speed is approximately 130 Mbps in a case where the resolution of the liquid crystal unit 104 is QVGA. The parallel signal path 112 is wired such that the lines pass through the connecting unit 106.

In other words, the plurality of signal lines that form the parallel signal path 112 are provided in the connecting unit 106. As described above, if the range of movement of the connecting unit 106 is increased, the risk increases that the movement will inflict damage on the parallel signal path 112. This would result in impairment of the reliability of the parallel signal path 112. On the other hand, if the reliability of the parallel signal path 112 is maintained, the range of movement of the connecting unit 106 will be restricted. It is for this reason that the serial transmission scheme has come to be widely used in mobile phones and the like in order to maintain the reliability of the parallel signal path 112 while also increasing the degree of freedom of the movable member that forms the connecting unit 106. The shift to the serial transmission scheme for the transmission line is also being promoted from the standpoint of electromagnetic interference (EMI).

(1-2: Device Configuration of Mobile Terminal 130 Adopting Serial Transmission Scheme)

Figure 2:
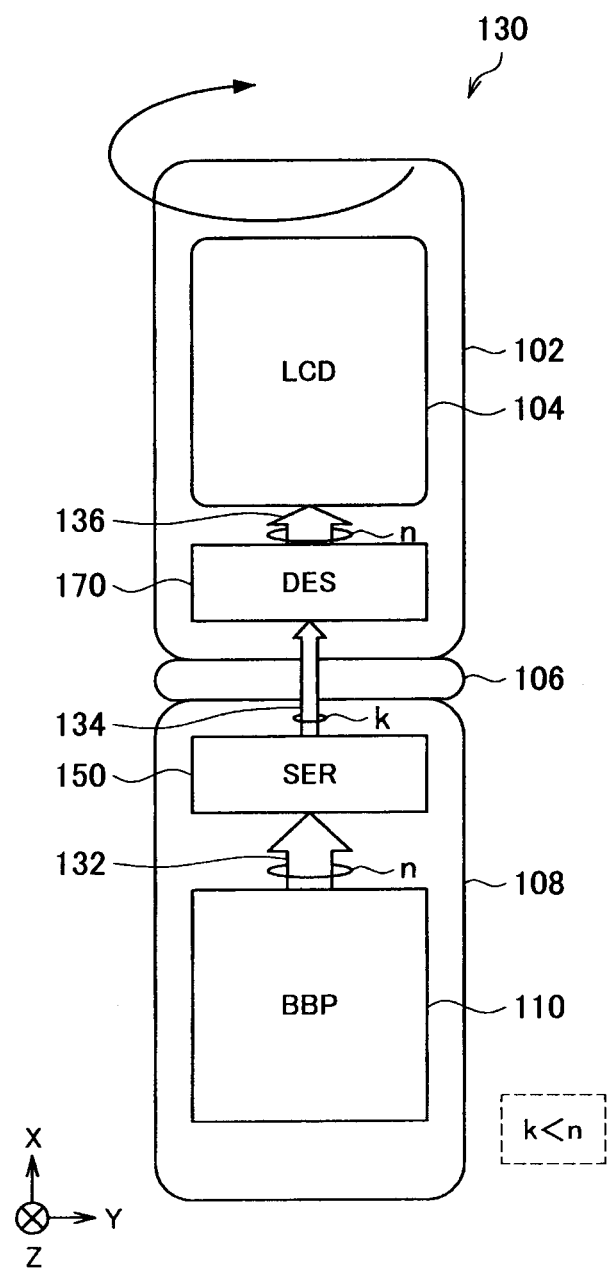
FIG. 2 is an explanatory diagram showing a configuration example of a mobile terminal adopting a serial transmission scheme.

Now, a device configuration of a mobile terminal 130 adopting the serial transmission scheme will be briefly described with reference to FIG. 2. FIG. 2 is an explanatory diagram showing an example of the device configuration of the mobile terminal 130 adopting the serial transmission scheme. In FIG. 2, a mobile phone is schematically illustrated as an example of the mobile terminal 130. However, the application scope of the technology described below is not limited to a mobile phone. For example, it can be applied to an information processing apparatus such as a notebook PC or various portable electronic devices. Furthermore, structural elements having functions substantially the same as those of the mobile terminal 100 of the parallel transmission scheme shown in FIG. 1 will be denoted with the same reference numerals, and detailed explanation of these structural elements will be omitted.

As shown in FIG. 2, the mobile terminal 130 mainly includes the display unit 102, the liquid crystal unit 104 (LCD), the connecting unit 106, and the operation unit 108. Also, the mobile terminal 130 includes the baseband processor 110 (BBP), parallel signal paths 132, 136, a serial signal path 134, a serializer 150, and a deserializer 170.

Unlike the mobile terminal 100 that is described above, the mobile terminal 130 transmits the image signal by the serial transmission scheme through the serial signal path 134 that is wired through the connecting unit 106. Therefore, the serializer 150 is provided in the operation unit 108 to serialize the parallel signal that is output from the baseband processor 110. On the other hand, the deserializer 170 is provided in the display unit 102 to parallelize the serial signal that is transmitted through the serial signal path 134.

The serializer 150 converts the parallel signal that is output from the baseband processor 110 and input through the parallel signal path 132 into a serial signal. The serial signal that has been converted by the serializer 150 is input to the deserializer 170 through the serial signal path 134. When the serial signal is input, the deserializer 170 restores the original parallel signal from the input serial signal. Then, the deserializer 170 inputs the parallel signal to the liquid crystal unit 104 through the parallel signal path 136.

In the serial signal path 134, NRZ data, for example, may be transmitted on its own, or alternatively, a data signal and a clock signal may be transmitted together. The number k of the lines in the serial signal path 134 is significantly less than the number n of the lines in the parallel signal path 112 in the mobile terminal 100 in FIG. 1 ($1 \leq k \ll n$). For example, the number k of the lines can be reduced to only a few lines. Therefore, the degree of freedom relating to the movable range of the connecting unit 106 through which the serial signal path 134 passes can be said to be very much greater than that of the connecting unit 106 through which the parallel signal path 112 passes. At the same time, it can also be said that the reliability of the serial signal path 134 is high. Additionally, a differential signal such as a LVDS or the like is ordinarily used for the serial signal that flows through the serial signal path 134. The LVDS is an abbreviation for Low Voltage Differential Signal.

Heretofore, the device configuration of the mobile terminal 130 has been briefly described. The overall device configuration of the mobile terminal 130 adopting the serial transmission scheme is approximately as described above. However, how much the number of signal lines in the connecting unit 106 can be reduced depends on the form of the signal flowing through the serial signal path 134. The serializer 150 and the deserializer 170 are to determine this form of a signal. The function of the mobile terminal 130 will be described later in detail, focusing on the configurations of the serializer 150 and the deserializer 170. But first, demerits of data transmission within a device according to a related art will be summarized.

(Summary of Issues 1)

As has been described, one of the demerits of data transmission within a device is that if the number of lines in the connecting unit 106 is large, the movement of the movable member will be restricted or the reliability will be impaired due to the increased risk of break in a line. To eliminate this demerit, first, the serial transmission scheme as described above was adopted. However, even when adopting the serial transmission scheme, a power line or the like has to be provided in the connecting unit 106, and thus, the number of lines would still be large. Also, in case of a small electronic device such as the mobile terminal 130 described above, it is desired to reduce the amount of power consumption as much as possible. Until now, a PLL has been used at the time of regenerating a clock at the receiving side. However, the amount of power consumption for driving the PLL is too large to ignore in a small electronic device. Accordingly, the encoding method of the new scheme described above has been proposed to cope with this issue.

A signal generated based on this encoding method according to the new scheme is a multilevel signal which includes almost no DC component, whose polarity is inverted every half cycle of a clock, and which expresses one bit value by a plurality of amplitude levels. This signal can be transmitted, being superimposed on a DC power. Furthermore, using this signal enables to regenerate a clock at the receiving side without using a PLL. Accordingly, a PLL does not have to be used, and power consumption can be kept at a low level to that extent. Also, the number of signal lines in the connecting unit 106 can be reduced. By adopting the encoding method according to the new scheme, it becomes possible to obtain a significant effect.

However, even with a high-speed data transmission scheme using the multilevel code according to the new scheme, frame synchronization has to be established at the receiving side to correctly decode data. Ordinarily, a method is used according to which a synchronization code, such as a K code or a comma code, is provided at the header portion added at the beginning of a frame, and frame synchronization is established at the receiving side by using the synchronization code. However, when using this method, the detection accuracy for the synchronization code will be dependent on the length of a known bit sequence in a header portion, and thus, false synchronization occurs unless the header potion is set to a sufficient length. For example, when the length of the known bit sequence is 8 bits, false synchronization occurs with the probability of $1/2^8=1/256$. In contrast, if the length of the known bit sequence is extended to reduce the probability of false synchronization, the proportion of a header portion in one frame increases and transmission efficiency is reduced.

In view of such issues, the inventor of the present invention has devised a frame synchronization method which enables to establish frame synchronization more surely without reducing the transmission efficiency. In the following, a case of applying the frame synchronization method to the mobile terminal 130 will be described as an example of an embodiment relating to the frame synchronization method, and the functional configurations of the serializer 150 and the deserializer 170 for this case will be described in detail. Additionally, the frame synchronization method according to the present embodiment will be described in the following by using, as a concrete example, the encoding method of the new scheme for which an AMI coding rule serves as a base. However, the application scope of the frame synchronization method according to the present embodiment is not limited to the encoding method of the new scheme, and it can be widely applied to a code format that uses polarity inversion, such as bipolar code, a code according to a partial response scheme, and the like, for example.

2: Embodiment

An embodiment of the present invention will be described. The present embodiment relates to a frame synchronization method which enables to establish frame synchronization more surely without reducing transmission efficiency, by making use of a coding rule violation in relation to the synchronization code. In the following, a case of applying the frame synchronization method to the mobile terminal 130 will be described as an example, and concrete technical contents according to the present embodiment will be described in detail.

(2-1: Functional Configuration of Mobile Terminal 130)

Now, the functional configuration of the mobile terminal 130 according to the present embodiment will be described with reference to FIGS. 3, 5 and 9. First, the overall functional configuration of the mobile terminal 130 will be described with reference to FIG. 3. Then, supplementary description will be given on the structural elements of the transmitting side included in the mobile terminal 130 with reference to FIGS. 5 to 7. Also, supplementary description will be given on the structural elements of the receiving side included in the mobile terminal 130 with reference to FIGS. 9 to 11. Herein, each method relating to the frame synchronization method of the present embodiment, such as an encoding method, a decoding method, a method of detecting a synchronization code, and the like, will also be described.

(2-1-1: Overall Functional Configuration)

First, the overall functional configuration of the mobile terminal 130 according to the present embodiment will be described with reference to FIG. 3. FIG. 3 is an explanatory diagram showing an example of the overall functional configuration of the mobile terminal 130 according to the present embodiment. Note that FIG. 3 is an explanatory diagram mainly illustrating the functional configurations of the serializer 150 and the deserializer 170, and description of other structural element is omitted.

Figure 3:
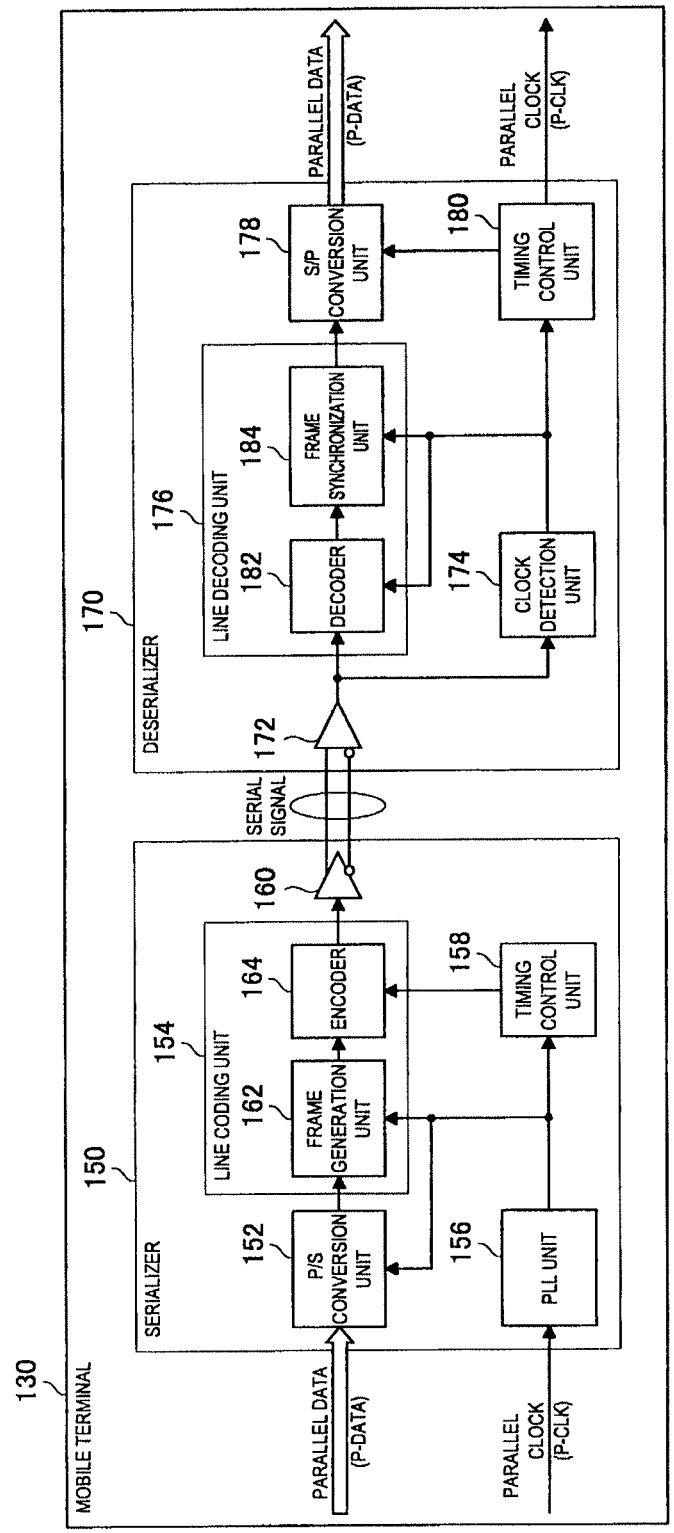
FIG. 3 is an explanatory diagram showing a functional configuration example of a mobile terminal according to an embodiment of the present invention.

As shown in FIG. 3, the mobile terminal 130 includes the serializer 150 and the deserializer 170. As has been described, parallel data and parallel data clock are input through the parallel signal path 132 to the serializer 150 from the baseband processor 110. The parallel data input to the serializer 150 is serialized based on the parallel data clock, and is then line coded and transmitted to the deserializer 170. The deserializer 170 decodes the serial data from the received serial signal.

At this time, a clock component is extracted from the received serial signal, and the serial data clock is regenerated based on the extracted clock component. The serial data decoded by the deserializer 170 is converted into parallel data and is input to the liquid crystal unit 104 and the like. In this manner, with the mobile terminal 130, a signal is serialized and transmitted from the serializer 150 to the deserializer 170. Also, a clock component is extracted from the received serial signal, and the parallel data clock is regenerated based on the extracted clock component.

In the following, the functional configurations of the serializer 150 and the deserializer 170 will be described, and at the same time, contents of signal processing, information processing and the like to be performed in the serializer 150 and the deserializer 170 in the overall flow of processes will be described in detail.

(Serializer 150)

First, the functional configuration of the serializer 150 will be described. As shown in FIG. 3, the serializer 150 mainly includes a P/S conversion unit 152, a line coding unit 154, a PLL unit 156, a timing control unit 158, and a driver 160. Furthermore, the line coding unit 154 includes a frame generation unit 162 and an encoder 164.

As described above, first, the parallel data (P-DATA) and the parallel data clock (P-CLK) are input from the baseband processor 110 to the serializer 150. The parallel data that is input to the serializer 150 is converted into serial data by the P/S conversion unit 152. The serial data that has been converted by the P/S conversion unit 152 is input to the line coding unit 154. The line coding unit 154 adds a header and the like to the serial data by the frame generation unit, and generates a transmission frame. Also, the line coding unit 154 encodes the transmission frame by the encoding method of the new scheme and generates a serial signal by the encoder 164.

The serial signal generated at the line coding unit 154 is input to the driver 160. The driver 160 transmits the serial signal to the deserializer 170 by a differential transmission scheme according to LVDS, for example. The encoding method of the line coding unit 154 will be described later. In contrast, the parallel data clock that is input to the serializer 150 is input to the PLL unit 156. The PLL unit 156 generates a serial data clock from the parallel data clock and inputs it to the P/S conversion unit 152, the line coding unit 154 and the timing control unit 158. The serial data clock that is input is used for a conversion process by the P/S conversion unit 152, an encoding process by the line coding unit 154, and a timing control process by the timing control unit 158. These processes will be described in the description of the encoding method according to the present embodiment.

(Deserializer 170)

Next, the functional configuration of the deserializer 170 will be described.

As shown in FIG. 3, the deserializer 170 mainly includes a receiver 172, a clock detection unit 174, a line decoding unit 176, an S/P conversion unit 178, and a timing control unit 180. Furthermore, the line decoding unit 176 includes a decoder 182 and a frame synchronization unit 184.

As described above, first, the serial signal is transmitted from the serializer 150 to the deserializer 170 by the differential transmission scheme according to LVDS. The serial signal is received by the receiver 172. The serial signal that is received by the receiver 172 is input to the line decoding unit 176 and the clock detection unit 174. When the serial signal is input, the line decoding unit 176 decodes the transmission frame from the serial signal by the decoder 182. Also, the line decoding unit 176 detects, by the frame synchronization unit 184, a header portion in the transmission frame, establishes frame synchronization, detects the beginning portion of the data and extracts the serial data. The decoding method of the line decoding unit 176 and the frame synchronization method will be described later.

The serial data that has been decoded by the line decoding unit 176 is input to the S/P conversion unit 178. The S/P conversion unit 178 converts the input serial data into the parallel data (P-DATA). The parallel data output from the S/P conversion unit 178 is output towards the liquid crystal unit 104. For its part, the clock detection unit 174 detects the clock component from the serial signal input by the receiver 172, and regenerates the serial data clock. At this time, the clock detection unit 174 detects the timing of the amplitude level of the serial signal crossing zero, and regenerates the serial data clock based on the detection result.

The serial data clock regenerated at the clock detection unit 174 is input to the line decoding unit 176 and the timing control unit 180. The serial data clock is used in a decoding process by the line decoding unit 176 and a timing control process by the timing control unit 180. Furthermore, the serial data clock input to the timing control unit 180 is converted to the parallel data clock (P-CLK) and is output to the liquid crystal unit 104.

Heretofore, the overall functional configuration of the mobile terminal 130 according to the present embodiment has been described. Note that detailed descriptions of the encoding method, the decoding method and the frame synchronization method according to the present embodiment are omitted in the above description. These methods will be described in detail in the following with reference to FIGS. 4 to 11.

(2-1-2: Detailed Functional Configuration of Transmitting Side)

First, a detailed functional configuration of the serializer 150 which corresponds to the transmitting side of a serial signal will be described with reference to FIGS. 3 to 7. However, the functional configuration of the serializer 150 has been already roughly described, and thus, the function of the line coding unit 154, which is the main technical feature of the present embodiment, will be described in detail. As has been described, the line coding unit 154 is configured from the frame generation unit 162 and the encoder 164 (see FIG. 3).

(Frame Generation Unit 162)

Figure 4:
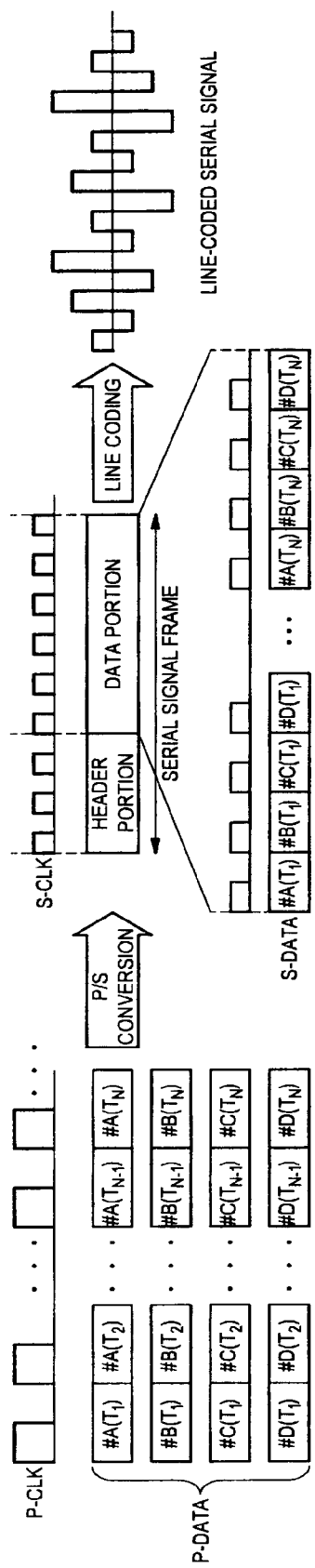
FIG. 4 is an explanatory diagram showing an example of a line coding method according to the present embodiment.

The frame generation unit 162 is means for adding a header or the like to the serial data input from the P/S conversion unit 152 and generating a serial signal frame. As shown in FIG. 4 for example, when serial data (S-DATA) "#A(T1), #B(T1), . . . , #D(TN)" is input from the P/S conversion unit 152, the frame generation unit 162 sets the input serial data to be a data portion of a serial signal frame. Then, the frame generation unit 162 adds, in front of the set data portion, a bit sequence of a specific length and with bit values 1 as a header portion, and generates a serial signal frame.

(Encoder 164)

The serial signal frame generated at the frame generation unit 162 is input to the encoder 164. The encoder 164 is means for line-coding the serial signal frame. The serial signal frame input to the encoder 164 is encoded based on the encoding method of the new scheme. Then, the serial signal after line coding as shown in FIG. 4 is generated. As shown in FIG. 4, the serial signal generated at the encoder 164 has a signal waveform for which the polarity is inverted every half cycle of the serial data clock and for which the same amplitude level does not occur consecutively. Accordingly, a clock component can be extracted from this signal without using a PLL.

(Detailed Functional Configuration)

Here, the detailed functional configurations of the frame generation unit 162 and the encoder 164 will be described with reference to FIG. 5, and also, the point of the line coding according to the present embodiment will be described. FIG. 5 is an explanatory diagram showing the detailed functional configurations of the frame generation unit 162 and the encoder 164 according to the present embodiment. Additionally, the example of FIG. 5 takes line coding of the present embodiment based on the AMI coding rule as its premise. Of course, the line coding method according to the present embodiment is not limited to that based on the AMI coding rule, and the present embodiment can also be applied to a bipolar coding rule or a partial response coding rule, for example.

Figure 5:
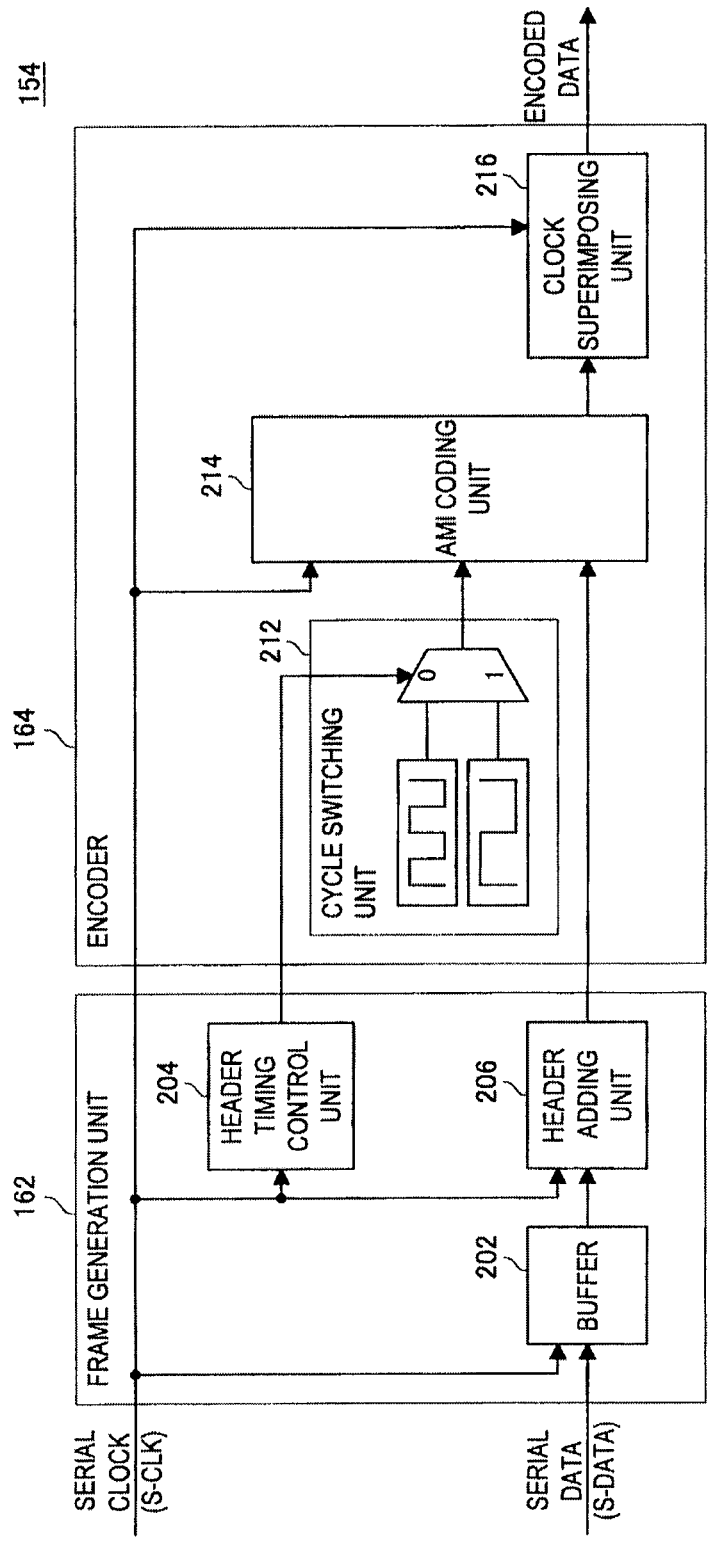
FIG. 5 is an explanatory diagram showing functional configurations of a frame generation unit and an encoder according to the present embodiment in greater detail.

As shown in FIG. 5, the frame generation unit 162 is configured from a buffer 202, a header timing control unit 204, and a header adding unit 206. Also, the encoder 164 is configured from a cycle switching unit 212, an AMI coding unit 214, and a clock superimposing unit 216. Additionally, the serial data clock (S-CLK) generated at the PLL unit 156 is input to the buffer 202, the header timing control unit 204, the header adding unit 206, the AMI coding unit 214, and the clock superimposing unit 216.

First, the serial data clock generated at the PLL unit 156 and the serial data (S-DATA) are input to the buffer 202. The input serial data is temporarily stored in the buffer 202. The serial data that is temporarily stored in the buffer 202 is input to the header adding unit 206 at the same timing as the serial data clock. At the header adding unit 206, a header is added to the beginning of the serial data input from the buffer 202, and a serial signal frame is generated.

Figure 6:
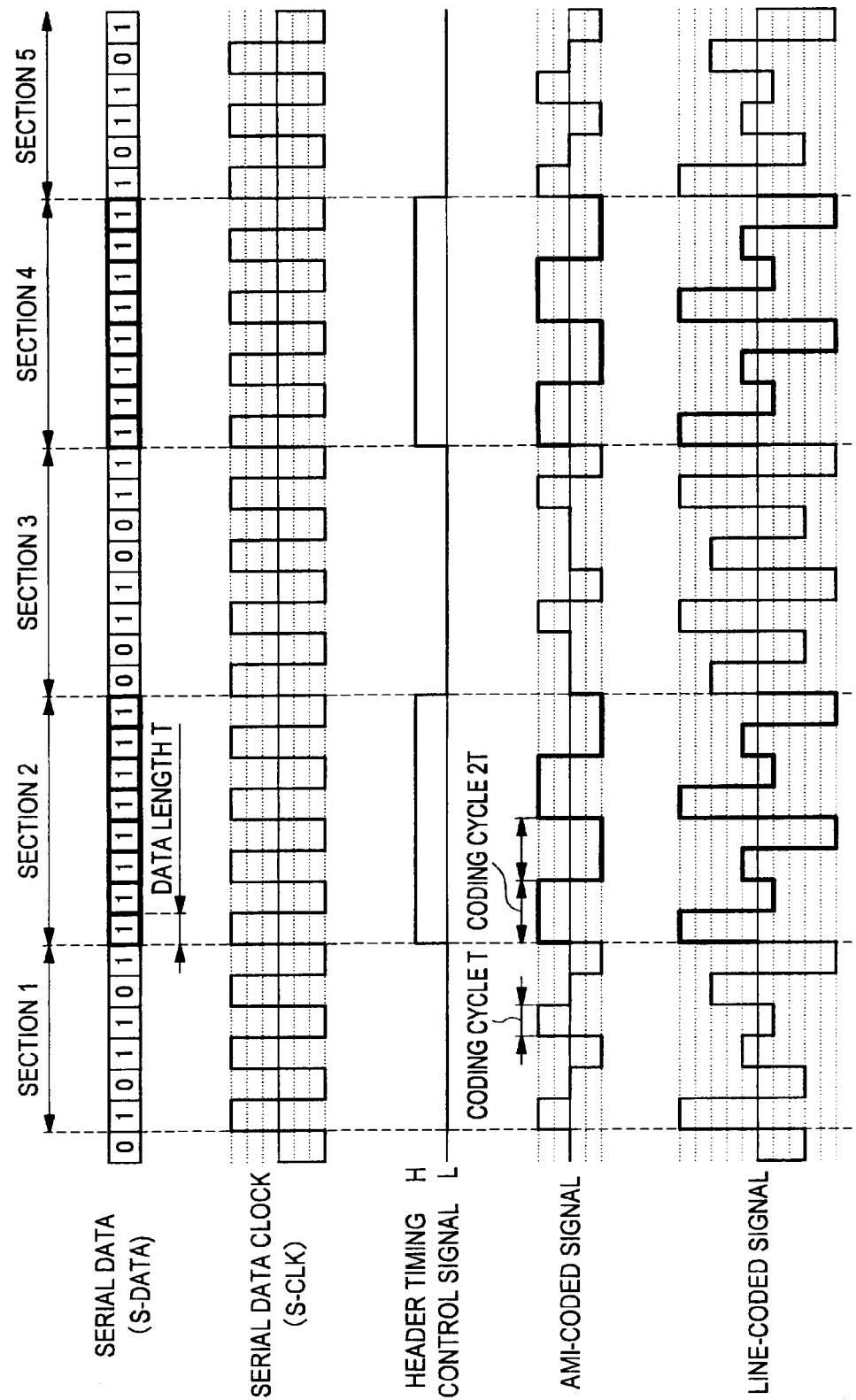
FIG. 6 is an explanatory diagram showing examples of the line coding method and an encoding method for a header portion according to the present embodiment.

At this time, a bit sequence of a specific length, which is constituted by bit values 1, is used as the header, for example. The serial signal frame generated at the header adding unit 206 becomes the bit sequence shown in FIG. 6 as "serial data," for example. In the example of FIG. 6, section 2 and section 4 are set as the header sections. Accordingly, bit sequences having bit values 1 are inserted in section 2 and section 4. The serial signal frame generated at the header adding unit 206 in this manner is input to the AMI coding unit 214 of the encoder 164.

Furthermore, a timing signal indicating a header section length is generated at the header timing control unit 204. The timing signal generated at the header timing control unit 204 becomes "header timing control signal" shown in FIG. 6, for example. Since headers are added in section 2 and section 4 in the example of FIG. 6, the header timing control signal is at H level in section 2 and section 4 and L level in section 1, section 3, and section 5. The header timing control signal generated at the header timing control unit 204 is input to the cycle switching unit 212 of the encoder 164.

As described above, the header timing control signal generated at the header timing control unit 204 is input to the cycle switching unit 212 of the encoder 164, and the serial signal frame generated at the header adding unit 206 is input to the AMI coding unit 214 of the encoder 164. The cycle switching unit 212 switches the coding cycle of the AMI coding performed at the AMI coding unit 214, based on the header timing control signal input from the header timing control unit 204. As has been described, the header timing control signal has a waveform which takes the value of H level in a header section included in the serial signal frame and the value of L level in other section.

Accordingly, in case the coding cycle in a section where the header timing control signal is at L level is T, the cycle switching unit 212 switches the coding cycle in an H-level section to 2*T. Information on the coding cycle which is switched by the cycle switching unit 212 according to the amplitude level of the header timing control signal in this manner is input to the AMI coding unit 214 as a control signal. Thus, the encoding process performed at the AMI coding unit 214 is performed based on the coding cycle that is switched by the cycle switching unit 212. The AMI coding unit 214 is means for encoding the serial signal frame according to the AMI coding rule.

The AMI coding rule uses an amplitude level of A or −A (for example, A=1) to express a bit value 1, and an amplitude level of 0 to express a bit value 0. The characteristic of the AMI coding rule lies in that the polarity of the amplitude level is inverted every time a bit value 1 appears. For example, when a bit sequence "1, 0, 1, 0, 0, 1" is input, the amplitude level of the AMI code is expressed as "1, 0, −1, 0, 0, 1." Accordingly, if coding is performed correctly in accordance with the AMI coding rule, the amplitude level of the AMI code will not consecutively take a value 1. Such pattern which is not possible according to a coding rule is called a coding rule violation.

The present embodiment proposes a method of desirably using the coding rule violation in the AMI code and establishing frame synchronization by using the coding rule violation. Specifically, a method is proposed according to which a coding rule violation is included in the header portion of the serial signal frame and frame synchronization is performed at the receiving side by detecting the coding rule violation. In case of the AMI coding rule, patterns that are coding rule violations are two patterns, (1, 1) and (−1, −1), for a bit sequence of two bits. The present embodiment uses the method of switching the coding cycle as a method of generating such code patterns. The switching control for the coding cycle is realized by the function of the cycle switching unit 212 described above.

Here, the encoding process by the AMI coding unit 214 will be concretely described with reference to FIG. 6. The serial data to which a header is added (serial signal frame) and information indicating the coding cycle that is switched in accordance with the header timing control signal (T→2*T, 2*T→T) are input to the AMI coding unit 214.

First, attention will be focused on section 1. Section 1 is a data portion of the serial signal frame. The AMI coding unit 214 performs encoding process based on the AMI coding rule on the bit sequence "1, 0, 1, 1, 0, 1" in section 1, which is the data portion, and generates an AMI-coded signal. At this time, the AMI coding unit 214 generates an AMI-coded signal with a coding cycle T which is the same as a half cycle T of the serial data clock. As a result, the amplitude level of the AMI-coded signal for section 1 becomes "1, 0, −1, 1, 0, −1." In this case, no coding rule violation is included in the AMI-coded signal of section 1. Additionally, the same can be said for section 3 and section 5 corresponding to the data portion of the serial signal frame.

Next, attention will be focused on section 2. Section 2 is a header portion of the serial signal frame. As has been described, a bit sequence of a specific length and with bit values 1 is added to the header portion. In the example of FIG. 6, a bit sequence longer than the bit length of the data portion is added. The AMI coding unit 214 performs the encoding process based on the AMI coding rule on the bit sequence "1, 1, 1, 1, 1, 1, 1" in section 2, which is the header portion, and generates an AMI-coded signal. Additionally, the AMI coding unit 214 generates an AMI-coded signal with a coding cycle 2*T which is two times the half cycle T of the serial data clock. As a result, the amplitude level of the AMI-coded signal for section 2 becomes "(1, 1), (−1, −1), (1, 1), (−1, −1)."

Additionally, expression ( . . . ) is used to indicate that encoding is performed based on a unit of coding cycle 2*T. In reality, a process of referring to the bit sequence in section 2 in a 2-bit unit and converting the bit sequence "1, 1, 1, 1" into an amplitude level "1, −1, 1, −1" of the AMI-coded signal is performed. As can be seen, no coding rule violation is included in the amplitude level "1, −1, 1, −1" when in units of 2 bits. However, when referring to the coding cycle T, the amplitude level of the AMI-coded signal in section 2 is "(1, 1), (−1, −1), (1, 1), (−1, −1)." Thus, section 2 includes patterns (1, 1) and (−1, −1), which are coding rule violations. Additionally, the same can be said for section 4 corresponding to the header portion of the serial signal frame.

As described, the AMI coding unit 214 is controlled by the cycle switching unit 212, and generates an AMI-coded signal while switching the coding cycle between the header portion and the data portion of the serial signal frame. As a result, an AMI-coded signal including the AMI coding rule violation in the header portion is generated. Reference will be again made to FIG. 5. The AMI-coded signal generated at the AMI coding unit 214 in the manner as described is input to the clock superimposing unit 216. The serial data clock is input together with the AMI-coded signal to the clock superimposing unit 216.

The serial data clock is superimposed, at the clock superimposing unit 216, on the AMI-coded signal generated at the AMI coding unit 214. At this time, the AMI-coded signal and the serial data clock are synchronously added with their edges aligned. Furthermore, a serial data clock having an amplitude level whose absolute value is larger than the absolute value of the maximum amplitude level of the AMI-coded signal is used. When a superimposition process is performed by the clock superimposing unit 216, a line-coded signal as shown in FIG. 6 is generated. The line-coded signal has a waveform of a multilevel signal whose polarity is inverted every half cycle of the serial data clock and which expresses one bit value by a plurality of amplitude levels.

As is understood from the example of FIG. 6, in case the half cycle T of the serial data clock is made one unit, a section where the same amplitude level consecutively occurs will inevitably appear in the header portion of the AMI-coded signal when an AMI-coded signal is generated at the header portion with the coding cycle being two times the half cycle T. Furthermore, if a section where bit value 0 consecutively occurs appears in a section corresponding to the data portion, a section where the amplitude level of the AMI-coded signal consecutively takes the value 0 will appear. If a section where the same amplitude level consecutively occurs is present, it becomes difficult for the receiving side to extract a clock component without using a PLL and regenerate the serial data clock.

However, by superimposing the serial data clock in the manner as described above, a signal waveform is formed in such a way that the polarity of the amplitude level is inverted every half cycle of the serial data clock even if the coding cycle is changed in the header portion. That is, a clock component can be extracted at the receiving side without using a PLL even from a line-coded signal for which the coding cycle in the header portion is changed.

Here, a coding rule for generating an AMI-coded signal and a coding rule for generating a line-coded signal will be summarized with reference to FIG. 7. FIG. 7 is an explanatory diagram showing a method of generating the AMI-coded signal and the line-coded signal according to the present embodiment. In the table shown in FIG. 7, the column "bit sequence" shows combination patterns of two consecutive bits (Bit(T), Bit(2T)) included in the serial signal frame. However, in the header portion, encoding corresponding to the AMI coding rule violation is performed, and thus, "N/A" is shown in the table of FIG. 7.

Furthermore, the column "after AMI coding" shows amplitude patterns of an AMI-coded signal obtained at the time of encoding the patterns described in the column "bit sequence" based on the AMI coding rule. Amplitude patterns of the AMI-coded signal corresponding to the coding rule violations by AMI code are shown in the "N/A" part in the column "bit sequence." Also, the column "after line coding" shows amplitude patterns of the line-coded signal obtained by superimposing the serial data clock on the patterns described in the column "after AMI coding." In the table shown in FIG. 7, patterns obtained by the encoding process based on the AMI coding rule will be expressed by pattern A. Also, the patterns corresponding to the AMI coding rule violation will be expressed by pattern B.

First, attention will be focused on the part pattern A. As described above, pattern A shows a method of encoding the AMI-coded signal and the line-coded signal in accordance with the AMI coding rule. Additionally, in the example of FIG. 7, the amplitude levels of the serial data clock are set to +1.5 and −1.5. Also, the possible amplitude levels of the AMI-coded signal are set to +1, 0, and −1. Accordingly, a bit sequence (0, 0) is converted into an amplitude pattern (0, 0) for the AMI-coded signal, and is further converted into an amplitude pattern (1.5, −1.5) for the line-coded signal.

Similarly, a bit sequence (0, 1) is converted into an amplitude pattern (0, 1) or (0, −1) for the AMI-coded signal, and is further converted into an amplitude pattern (1.5, −0.5) or (1.5, −2.5) for the line-coded signal. Also, a bit sequence (1, 0) is converted into an amplitude pattern (1, 0) or (−1, 0) for the AMI-coded signal, and is further converted into an amplitude pattern (2.5, −1.5) or (0.5, −1.5) for the line-coded signal. Also, a bit sequence (1, 1) is converted into an amplitude pattern (1, −1) or (−1, 1) for the AMI-coded signal, and is further converted into an amplitude pattern (2.5, −2.5) or (0.5, −0.5) for the line-coded signal.

Next, attention will be focused on the part pattern B. As described above, pattern B shows a method of generating the AMI-coded signal and the line-coded signal based on the AMI coding rule violation. The pattern of the bit sequence will not be referred to here, but as illustrated in FIG. 6, it is applied to a header portion constituted by bit values 1. As shown in FIG. 7, in the header portion ("N/A"), the bit sequence is converted into an amplitude pattern (1, 1) or (−1, −1) for the AMI-coded signal, and is further converted into an amplitude pattern (2.5, −0.5) or (0.5, −2.5) for the line-coded signal.

As described above, the encoding process of pattern A is performed on the data portion of the serial signal frame, and the encoding process of pattern B is performed on the header portion. The method of generating the line-coded signal by synchronously adding the serial data clock after the AMI coding has been described above. However, a method can also be conceived according to which the line-coded signal is generated directly from the serial signal frame based on the correspondence relationship between "bit sequence" and "after line coding" shown in FIG. 7. Of course, such modified example relating to the method of generating the line-coded signal is also within the technical scope of the present embodiment.

(2-1-3: Detailed Functional Configuration of Receiving Side)

Next, detailed functional configuration of the deserializer 170 corresponding to the receiving side of the serial signal will be described with reference to FIGS. 8 to 11. However, the functional configuration of the deserializer 170 has been already roughly described, and thus, the detailed functional configuration of the line decoding unit 176, which is the main technical feature of the present embodiment, will be described along with describing a concrete circuit configuration. As has been described, the line decoding unit 176 is configured from the decoder 182 and the frame synchronization unit 184 (see FIG. 3).

(Decoder 182)

As shown in FIG. 3, the serial signal (line-coded signal) received by the receiver 172 is input to the decoder 182. The eye pattern of the line-coded signal received by the receiver 172 is as shown in FIG. 8. FIG. 8 shows the eye pattern of the line-coded signal in association with the serial data clock, the bit sequence, and the AMI-coded signal. As described above, the line-coded signal is obtained by superimposing the serial data clock taking amplitude levels 1.5 and −1.5 on the AMI-coded signal whose possible amplitude levels are 1, 0 and −1. Accordingly, the line-coded signal may take six values, 2.5, 1.5, 0.5, −0.5, −1.5 and −2.5, as the amplitude level.

As described later, each of these amplitude levels is detected by using a plurality of comparators for which specific threshold levels are set. The serial signal frame is decoded based on the detected amplitude level. The process of detecting the amplitude level of the received line-coded signal and the process of decoding the serial signal frame based on the detection result are performed by the decoder 182. Additionally, the decoding of the serial signal frame based on the amplitude level of the line-coded signal is realized by inversely using pattern A of the line coding rule shown in FIG. 7. However, the header portion is not correctly decoded at the decoder 182. Accordingly, the detection result of the amplitude level is input to the frame synchronization unit 184 described later, and a detection process for the header portion is performed.

(Frame Synchronization Unit 184)

As described above, the amplitude level of the line-coded signal detected at the decoder 182 is input to the frame synchronization unit 184. Thus, the frame synchronization unit 184 refers to the amplitude level of the line-coded signal, and detects a 2-bit amplitude pattern that is a coding rule violation. The amplitude pattern of the coding rule violation of the line coding rule includes two patterns (2.5, −0.5) and (0.5, −2.5) shown in pattern B of FIG. 7. When such amplitude pattern that is a coding rule violation is detected, the frame synchronization unit 184 outputs a frame synchronization signal for identifying the header portion based on the timing of detection. The serial data can be correctly restored by extracting the data portion of the serial signal frame that has been decoded at the decoder 182 in accordance with the frame synchronization signal output from the frame synchronization unit 184.

(Concrete Circuit Configuration)

Here, concrete circuit configurations of the decoder 182 and the frame synchronization unit 184 will be described with reference to FIG. 9. FIG. 9 is an explanatory diagram showing concrete circuit configurations of the decoder 182 and the frame synchronization unit 184 according to the present embodiment. Additionally, the circuit configurations shown in FIG. 9 are only examples, and alterations are possible insofar as they are within the scope of the technical idea of the present embodiment. Configurations obtained by such alterations are also within the technical scope of the present embodiment.

Figure 9:
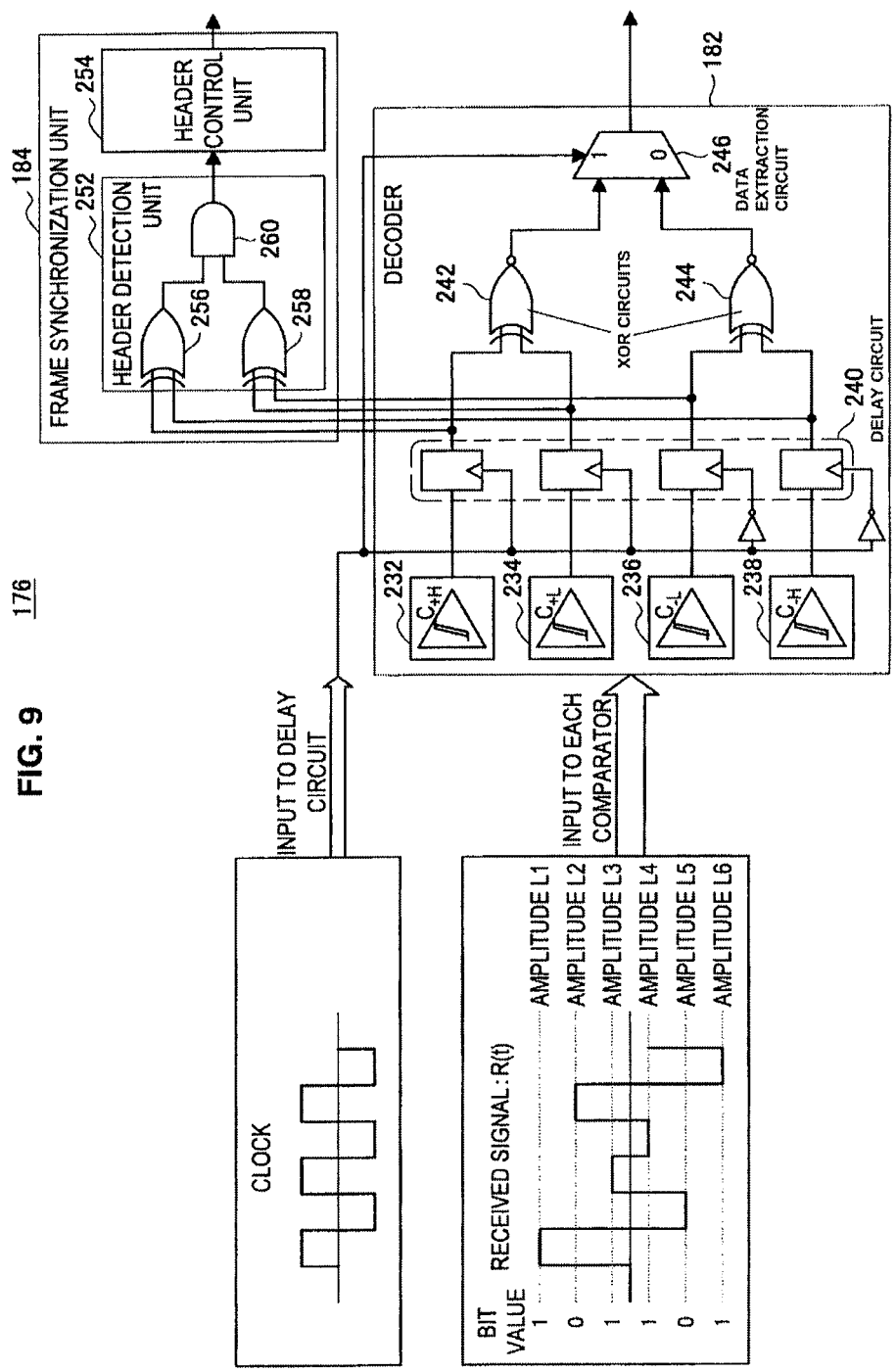
FIG. 9 is an explanatory diagram showing the functional configurations of the decoder and the frame synchronization unit according to the present embodiment in greater detail.

As shown in FIG. 9, the decoder 182 is configured from a plurality of comparators 232, 234, 236, 238, a delay circuit 240, XOR circuits 242, 244, and a data extraction circuit 246. Also, the frame synchronization unit 184 is configured from a header detection unit 252, and a header control unit 254. Furthermore, the header detection unit 252 is configured from XOR circuits 256, 258, and an AND circuit 260. Additionally, the serial data clock regenerated at the clock detection unit 174 and the line-coded signal (received signal: R(t)) received by the receiver 172 are input to the decoder 182.

The serial data clock input to the decoder 182 is input to the delay circuit 240 and the data extraction circuit 246. Also, the line-coded signal input to the decoder 182 is input to the plurality of comparators 232, 234, 236, 238. Additionally, a threshold level $C_{+H}$ is set for the comparator 232, a threshold level $C_{+L}$ is set for the comparator 234, a threshold level $C_{-L}$ is set for the comparator 236, and a threshold level $C_{-H}$ is set for the comparator 238. Conditions shown in the following Formula 1 are assigned to the threshold levels $C_{+H}$, $C_{+L}$, $C_{-L}$, and $C_{-H}$ (refer to FIG. 9 for the amplitude levels L1, L2, ..., L6). Accordingly, output values (hereinafter, threshold determination results) as shown in the following Formula 2 are obtained from the comparators 232, 234, 236, 238.

[Expression 1]

Threshold level $C_{+H}$: $L2<C_{+H}<L1$,

Threshold level $C_{+L}$: $L3<C_{+L}<L2$,

Threshold level $C_{-L}$: $L5<C_{+L}<L4$,

Threshold level $C_{-H}$: $L6<C_{+H}<L5$. (Formula 1)

[Expression 2]

$R(t) \geq$ Amplitude level $L1 \rightarrow C_{+H}=1$, $C_{+L}=1$, $C_{-H}=0$, $C_{-L}=0$;

$R(t) \geq$ Amplitude level $L2 \rightarrow C_{+H}=0$, $C_{+L}=1$, $C_{-H}=0$, $C_{-L}=0$;

$R(t) \geq$ Amplitude level $L5 \rightarrow C_{+H}=0$, $C_{+L}=0$, $C_{-H}=0$, $C_{-L}=1$;

$R(t) \geq$ Amplitude level $L6 \rightarrow C_{+H}=0$, $C_{+L}=0$, $C_{-H}=1$, $C_{-L}=1$;

Others $\rightarrow C_{+H}=0$, $C_{+L}=0$, $C_{-H}=0$, $C_{-L}=0$. (Formula 2)

Figure 10:
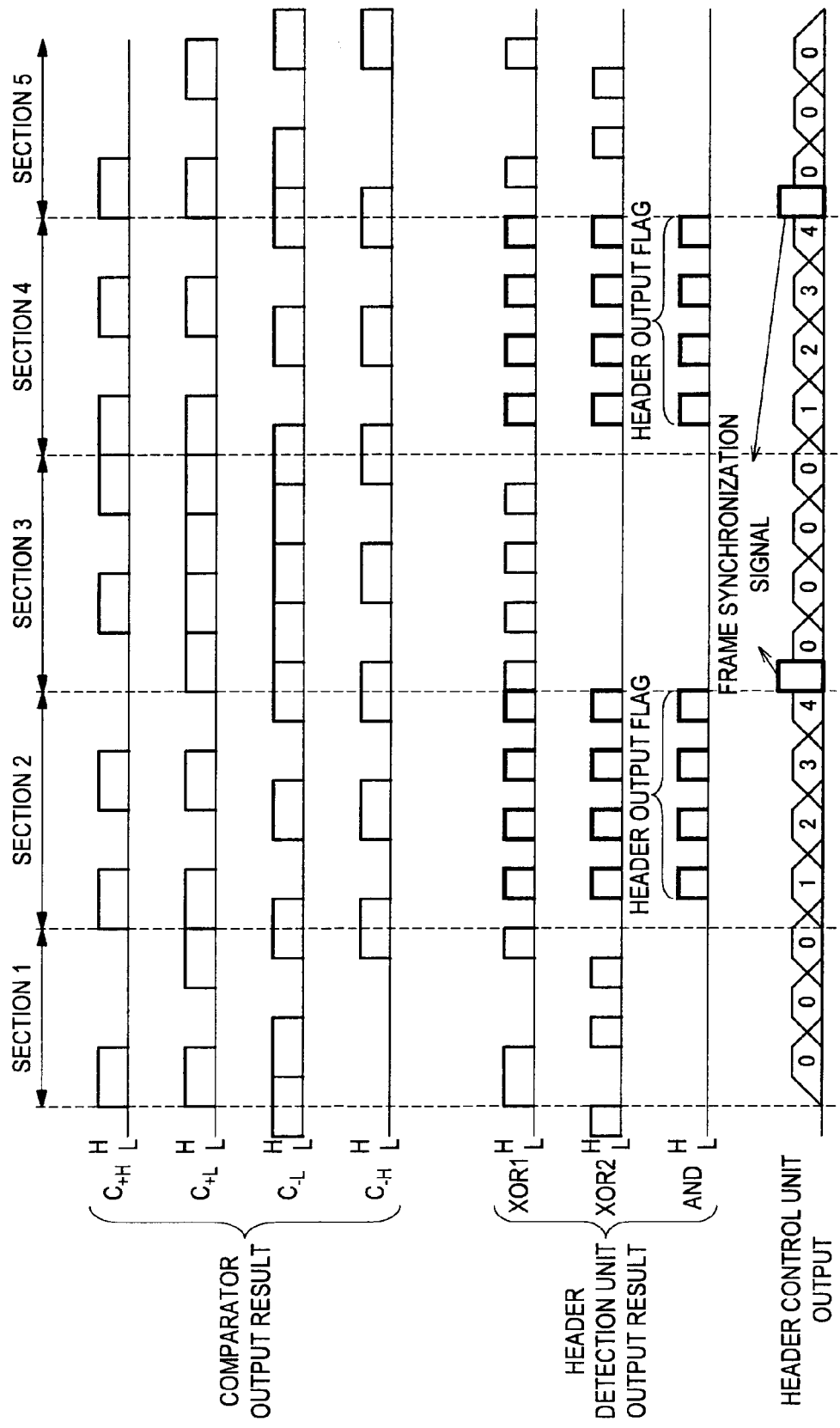
FIG. 10 is an explanatory diagram showing examples of a decoding method and a frame synchronization method according to the present embodiment.

For example, a pulse signal as shown in FIG. 10 is output as the threshold determination result from each comparator 232, 234, 236, 238. The pulse signals output from the comparators 232, 234 are structured from a pulse that rises at a timing the amplitude level of the line-coded signal crosses upward each threshold level and falls at a timing the amplitude level crosses downward each threshold level. In contrast, the pulse signals output from the comparators 236, 238 are structured from a pulse that rises at a timing the amplitude level of the line-coded signal crosses downward across each threshold level and falls at a timing the amplitude level crosses upward across each threshold level. In this manner, a pulse signal indicating the timing of crossing the threshold level is output as the threshold determination result from each comparator 232, 234, 236, 238.

The pulse signals are input to the delay circuit 240. Any of the signals is delayed at the delay circuit 240 so that the edges of the pulse signals output from the comparators 232, 234, 236, 238 and the edge of the serial data clock detected by the clock detection unit 174 are aligned. At this time, the pulse signals output from the comparators 232, 234 are synchronized with the rising timing of the serial data clock. In contrast, the pulse signals output from the comparators 236, 238 are synchronized with the falling timing of the serial data clock. Thus, the outputs of the comparators 236, 238 are delayed than the outputs of the comparators 232, 234 by half clock. Additionally, the delay circuit 240 is configured by using a delay element such as a flip-flop circuit, for example.

An output signal of the delay circuit 240 corresponding to the output of the comparator 232, 234 is input to the XOR circuit 242. Also, an output signal of the delay circuit 240 corresponding to the output of the comparator 236, 238 is input to the XOR circuit 244. Furthermore, the output signal of the delay circuit 240 corresponding to the output of the comparator 232, 238 is input to the XOR circuit 256 provided in the header detection unit 252 of the frame synchronization unit 184. Furthermore, the output signal of the delay circuit 240 corresponding to the output of the comparator 234, 236 is input to the XOR circuit 258 provided in the header detection unit 252 of the frame synchronization unit 184.

At the XOR circuit 242, an L level is output in case the amplitude level L is $C_{+L}<L<C_{+H}$, and an H level is output in other case. Similarly, at the XOR circuit 244, an L level is output in case the amplitude level L is $C_{-H}<L<C_{-L}$, and an H level is output in other case. Accordingly, a signal output which is at L level in a section where the amplitude level is L2 or L5 and which is at H level in a section where the amplitude level is L1, L3, L4, or L6 is obtained by the logical operation of the XOR circuit 242, 244. This signal output is input to the data extraction circuit 246.

The data extraction circuit 246 samples the level value of the signal output described above in synchronization with the rising or falling timing of the serial data clock detected by the clock detection unit 174, and outputs a bit value 1 in case of H level and outputs a bit value 0 in case of L level. The output of the data extraction circuit 246 corresponds to a decoding result of the serial signal frame obtained by performing a decoding process corresponding to pattern A of FIG. 7 on the line-coded signal. Accordingly, the header portion of the serial signal frame is not correctly decoded.

Thus, a process of extracting the data portion from the output of the data extraction circuit 246 is performed later at the line decoding unit 176. At this time, the decoder 182 has to know the timing between the header portion and the data portion of the serial signal frame. That is, to realize the extraction process for the data portion, the timing corresponding to the beginning position of the data portion becomes necessary for detecting the header portion of the serial signal frame. Such detection of the header portion is performed at the frame synchronization unit 184.

As has been described, the output signal of the delay circuit 240 corresponding to the output of each comparator 232, 234, 236, 238 is input to the frame synchronization unit 184. More specifically, the output signal of the delay circuit 240 is input to the XOR circuit 256, 258 of the header detection unit 252 configuring the frame synchronization unit 184.

The output signal of the delay circuit 240 corresponding to the output of the comparator 232, 238 is input to the XOR circuit 256. The output of the comparator 232 is at H level when the amplitude level L of the line-coded signal is $L>C_{+H}$. Also, the output of the comparator 238 is at H level when the amplitude level L of the line-coded signal is $L<C_{-H}$. Accordingly, the output of the XOR circuit 256 is at H level only during a period when the combination of the amplitude levels of the line-coded signal in a section of two consecutive bits is (L1, L4), (L1, L5), (L2, L6) or (L3, L6), and is at L level in other periods.

Furthermore, the output signal of the delay circuit 240 corresponding to the output of the comparator 234, 236 is input to the XOR circuit 258. The output of the comparator 234 is at H level when the amplitude level L of the line-coded signal is L>$C_{+L}$. Also, the output of the comparator 236 is at H level when the amplitude level L of the line-coded signal is L<$C_{-L}$. Accordingly, the output of the XOR circuit 258 is at H level only during a period when the combination of the amplitude levels of the line-coded signal in a section of two consecutive bits is (L1, L4), (L2, L4), (L3, L5) or (L3, L6), and is at L level in other periods.

The output of the XOR circuit 256, 258 obtained in this manner is input to the ADD circuit 260. The ADD circuit 260 outputs an H level only during a period of amplitude level combination according to which both XOR circuits 256, 258 are at H level, and outputs an L level in other periods. The combination of amplitude levels according to which both XOR circuits 256, 258 are at H level includes two patterns (L1, L4) and (L3, L6). Referring to FIG. 7, these two patterns (L1, L4) and (L3, L6) respectively correspond to (2.5, −0.5) and (0.5, −2.5), and thus correspond to pattern B. That is, the output of the ADD circuit 260 is nothing other than the detection result of a coding rule violation relating to the line coding rule.

Additionally, the correspondence relationship between combination R(T), R(2T) of each amplitude level of the line-coded signal and output pattern of the comparator 232, 234, 236, 238 is summarized for a section t=T, 2T of two consecutive bits as FIG. 11. Pattern 1 and pattern 2 of FIG. 11 correspond to pattern B of FIG. 7. A description has been made above for a flow of detecting a coding rule violation by referring each time to the amplitude pattern of the line-coded signal. In reality, pattern 1 and pattern 2 of FIG. 11 are detected in the form of output of the ADD circuit 260, through signal processing as shown in FIG. 10.

Additionally, the example shown in FIG. 10 concretely shows the flow of signal processing on the line-coded signal illustrated in FIG. 6. For example, the output result of the XOR circuit 256, 258 for the output result of the comparator 232, 234, 236, 238 is the header detection unit output result XOR1, XOR2 shown in FIG. 10. The XOR1 corresponds to the output of the XOR circuit 256, and the XOR2 corresponds to the output of the XOR circuit 258. Also, the output of the ADD circuit 260 is the header detection unit output result AND shown in FIG. 10. Additionally, the logical operation of XOR1, XOR2, ADD shown in FIG. 10 can be expressed as the following Formula 3. Furthermore, the operation result of the following Formula 3 is f(T, 2T)=1 for pattern 1 or pattern 2 of FIG. 11, and is f(T, 2T)=0 for other case.

[Expression 3]

$$f(T,2T)=(C_{+H} \oplus C_{-H})+(C_{+L} \oplus C_{-L})$$ (Formula 3)

The symbol $\oplus$ indicates an XOR operation. Also, the symbol "+" indicates an add operation. Furthermore, $C_{+H}$, $C_{-H}$, $C_{+L}$, and $C_{-L}$ in Formula 3 each indicate a comparator output corresponding to each threshold level.

As is clear from the concrete example shown in FIG. 10, the timings of section 2 and section 4 corresponding to the header portions are obtained as the outputs (header output flags) of the ADD circuit 260 as a result of the signal processing by the decoder 182 and the header detection unit 252. As shown in FIG. 9, the output of the ADD circuit 260 is input to the header control unit 254. The header control unit 254 outputs the frame synchronization signal (see FIG. 10) based on the header output flag output from the ADD circuit 260. Then, the line decoding unit 176 extracts the data portion of the serial signal frame from the output data of the decoder 182 based on the frame synchronization signal. Additionally, as for the timing of outputting the frame synchronization signal, the number of the header output flags as shown in FIG. 10 may be counted and the frame synchronization signal may be output at the timing the number exceeds a specific number, for example.

Heretofore, the circuit configurations of the decoder 182 and the frame synchronization unit 184 have been described in detail. In this manner, by using the circuit configuration of the frame synchronization unit 184 according to the present embodiment, the coding rule violation of the line coding rule according to the present embodiment can be detected, and frame synchronization can be established for sure.

As described above, the mobile terminal 130 according to the present embodiment generates a coding rule violation in the header portion of the serial signal frame by switching the coding cycle of the AMI code at the transmitting side. Then, at the receiving side, the mobile terminal 130 detects the coding rule violation from the outputs of a plurality of comparators, generates the frame synchronization signal indicating the beginning of the header portion, establishes frame synchronization of the serial signal frame based on the frame synchronization signal, and extracts the data portion for sure. This configuration makes it possible to detect a header by a relatively simple circuit configuration at the receiving side. Also, since a special bit sequence is not necessary for header detection, false detection of a frame attributable to bit pattern can be avoided.

(2-2: Encoding Method)

Here, the encoding method according to the present embodiment will be briefly described. As has been described, the feature of the encoding method according to the present embodiment lies in that the coding cycle is changed at the header portion of the serial signal frame. For example, as with the encoding method illustrated in FIG. 6, the data portion is encoded with the coding cycle T the same as the half cycle (T) of the serial data clock at the time the serial signal frame (S-DATA) is converted into the AMI-coded signal. In contrast, the header portion is encoded with the coding cycle 2*T the same as one cycle (2*T) of the serial data clock. By changing the coding cycle in this manner, the AMI coding rule violation is formed in a portion corresponding to the header portion in the AMI-coded signal. The AMI coding rule violation here means a pattern which is not possible according to the AMI coding rule occurs at the time of decoding with the coding cycle T of the data portion.

Furthermore, with the encoding method according to the present embodiment, the line-coded signal is generated by superimposing the serial data clock on the AMI-coded signal that has been generated in accordance with the AMI coding rule while changing the coding cycle. By using such line coding method, the multilevel signal whose polarity is inverted every half cycle of the serial data clock as shown in FIG. 6 is generated. By using such multilevel signal, the receiving side can regenerate the serial data clock without using a PLL. Also, by detecting the coding rule violation of the AMI coding rule described above, a section corresponding to the header portion can be detected with a relatively simple circuit configuration. Furthermore, since the detection accuracy for the coding rule violation is not dependent on the length of the header portion, the probability of false synchronization can be greatly reduced without reducing the transmission efficiency.

(2-3: Frame Synchronization Method)

Here, the frame synchronization method according to the present embodiment will be briefly described. As has been described, the feature of the frame synchronization method according to the present embodiment lies in that the coding rule violation at the header portion of the serial signal frame is detected, and frame synchronization is established based on the detection result. The coding rule violation can be obtained by detecting an amplitude pattern corresponding to the coding rule violation from among the amplitude patterns of the line-coded signal. The detection process for the coding rule violation is realized by the circuit configuration of the header detection unit 252 shown in FIG. 9, for example. However, since an amplitude pattern of two consecutive bits is used, the delay circuit 240 provided in the decoder 182 is also necessary. The header detection unit 252 is configured from two XOR circuits 256, 258, and one ADD circuit 260, and is relatively simple. As described, using the coding rule violation for frame synchronization detection enables to simplify the circuit configuration of the receiving side used for this synchronization process. Thus, the circuit size and the power consumption amount at the receiving side can be reduced.

(2-4: Modified Example (Encoding Method, Frame Synchronization Method))

As has been already described, when using the encoding method and the frame synchronization method according to the present embodiment, the probability of false synchronization can be greatly reduced without reducing the transmission efficiency. This is because when using the method of the present embodiment, a special synchronization code does not have to be used to detect the header portion. In the past method, a special synchronization code such as a K code or a comma code was used at the beginning of a frame. According to this method, the receiving side detected the special synchronization code, and identified the portion where the synchronization code was detected as the header. Accordingly, when a pattern same as the synchronization code appeared in the data portion, false synchronization was caused. Thus, with the past method, a synchronization code having a sufficient length had to be used to sufficiently reduce the probability of the synchronization code appearing in the data portion. As a result, the proportion of the synchronization code in one frame increased, and the transmission efficiency was reduced.

Figure 12:
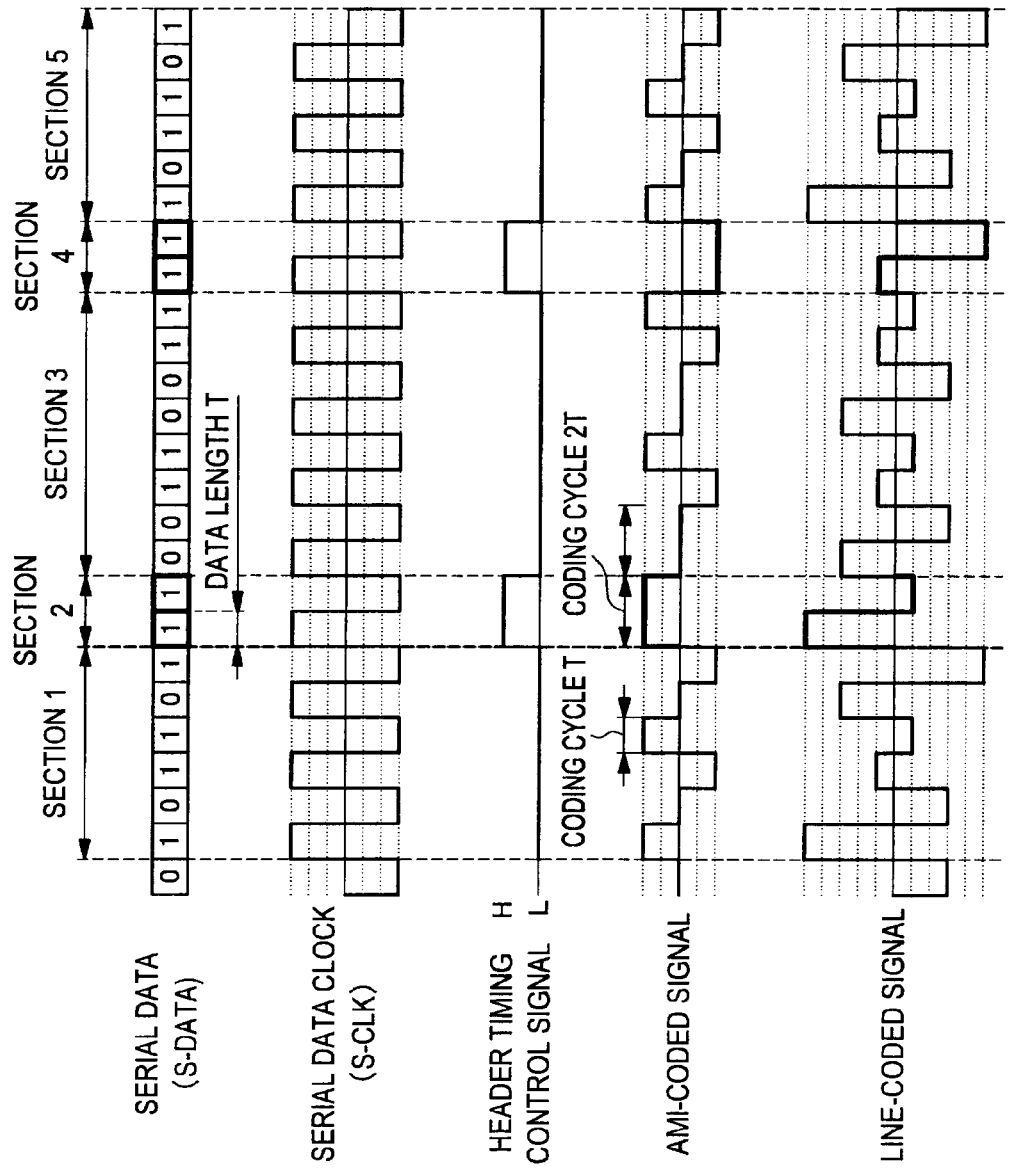
FIG. 12 is an explanatory diagram showing an example of a line coding method according to a modified example of the present embodiment.

However, unlike the past method, the present embodiment uses a coding rule violation instead of a special synchronization code. In principle, the coding rule violation does not occur in a data portion which is correctly encoded. Thus, as long as the coding rule violation does not occur due to the occurrence of a transmission error or the like, a header portion can be detected for sure. Also, in case of using a transmission line with high transmission quality, the length of the header portion can be reduced down to, for example, two bits as shown in FIG. 12. That is, the header portion can be reduced to a minimum length allowing the generation of the coding rule violation. Furthermore, when applying the method of the present embodiment, the probability of false detection itself does not change even if the data length of one frame is increased. Thus, the length of the header portion can be reduced as appropriate according to the expected transmission error rate or the like, regardless of the data length of one frame.

Figure 13:
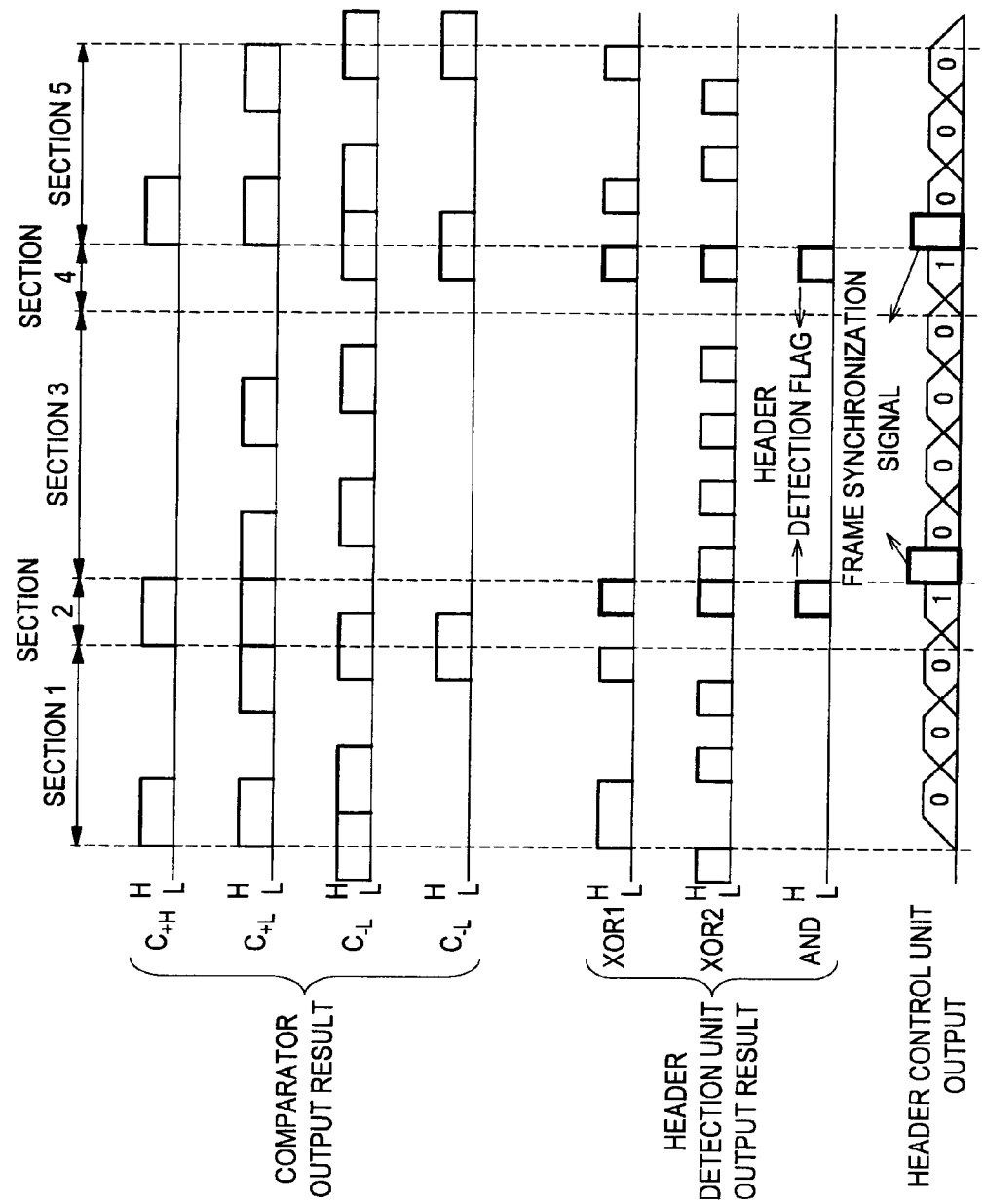
FIG. 13 is an explanatory diagram showing examples of a decoding method and a frame synchronization method according to a modified example of the present embodiment.

When the length of the header portion is made two bits as shown in FIG. 12, the receiving side can detect a coding rule violation at the header portion in the processing flow as shown in FIG. 13, and can output a frame synchronization signal. Additionally, even if the length of the header portion is reduced, the circuit configurations of the decoder 182 and the header detection unit 252 do not change from those shown in FIG. 9. Additionally, when the length of the header portion is made two bits as in the example shown in FIG. 12, there is a concern that a DC component will be included in the line-coded signal in section 2 and section 4 corresponding to the header portion. However, when averaged while taking into account section 3, section 5 and the like corresponding to the data portion, such DC component becomes negligible, and thus the concern can be eliminated. As described, when using the encoding method and the frame synchronization method according to the present embodiment, the probability of false detection can be greatly reduced without reducing the transmission efficiency.

3: Conclusion

Lastly, the functional configuration of the information processing apparatus according to the present embodiment, and the effects obtained by the functional configuration will be briefly summarized. Additionally, this information processing apparatus can be mounted on the mobile phone such as the above-described mobile terminal 130, a portable game machine, a notebook PC, a portable information terminal, and the like, for example. Also, it is suitably used in an electronic device including a configuration which includes structural elements such as the transmitting unit and the receiving unit respectively corresponding to the serializer 150 and the deserializer 170 and according to which data transmission is performed therebetween.

The functional configuration of the information processing apparatus described above can be expressed as follows. The information processing apparatus includes a frame generation unit, an encoding unit, a cycle changing unit, and a line coding unit that are described in the following. The frame generation unit is for generating a transmission frame by adding, to transmission data, a header indicating a beginning position of the transmission data. Note that the header to be added by the frame generation unit does not have to be a synchronization code having a special pattern that can be distinguished from the pattern of the transmission data. Also, the bit length of the header can be reduced to a minimum length allowing a coding rule violation under a specific coding scheme to be formed, regardless of the length of the transmission data.

Furthermore, the encoding unit is for encoding the transmission frame generated by the frame generation unit according to a specific coding scheme, and generating encoded data expressed by mutually different first and second bit values. Note that the encoding unit is controlled by the cycle changing unit described below. The cycle changing unit is for changing a coding cycle in a header section by controlling the encoding unit. That is, by the encoding unit being controlled by the cycle changing unit, encoded data for which the coding cycle is changed only in the section of the header is generated by the encoding process by the encoding unit. As such, a coding rule violation of a case where the coding cycle of the transmission data is taken as a reference is included in the section of the header encoded with a coding cycle different from the transmission data. Thus, the section of the header can be identified by detecting the coding rule violation.

Furthermore, the line coding unit is for performing line coding on the encoded data generated by the encoding unit, and generating an encoded signal which expresses the first bit value in a form of a plurality of first amplitude levels and the second bit value in a form of a plurality of second amplitude levels different from the first amplitude levels such that a same amplitude level does not occur consecutively and for which a polarity of the amplitude level is inverted every half cycle of a clock. As such, by performing line coding such that the polarity of the amplitude level is inverted every half cycle of the clock, a clock can be extracted without using a PLL at the receiving side. As a result, a PLL does not have to be provided at the receiving side, and the circuit scale and the power consumption amount can be reduced to that extent.

Furthermore, the information processing apparatus further includes a signal transmitting unit, a signal receiving unit, an amplitude detection unit, a coding rule violation detection unit, and a header detection unit that are described in the following. The signal transmitting unit is for transmitting the encoded signal generated by the line coding unit. Also, the signal receiving unit is for receiving the encoded signal transmitted by the signal transmitting unit. As such, the technology according to the present embodiment is used by an information processing apparatus for data transmission within the apparatus, for example. Furthermore, the amplitude detection unit is for detecting an amplitude level of the encoded signal received by the signal receiving unit. The amplitude level of the encoded signal can be detected by using a comparator for which a specific threshold level is set. Then, the amplitude pattern corresponding to the coding rule violation under the specific coding scheme can be detected by the coding rule violation detection unit from the detection result by the amplitude detection unit.

As described above, according to the present embodiment, the coding rule violation is used for detecting the header section. The transmitting side generates the coding rule violation by changing the coding cycle for the heard section. In contrast, the receiving side detects the coding rule violation by the coding rule violation detection unit. Then, the beginning position of the transmission data is detected by the header detection unit based on a position of the amplitude pattern detected by the coding rule violation detection unit. As such, by detecting the coding rule violation and detecting the header based on the detection result, the probability of false detection can be greatly reduced without reducing the transmission efficiency. If a causing factor of the coding rule violation, such as a transmission error or the like, is not to be taken into consideration, the header can be detected for sure by applying the technology of the present embodiment.

Furthermore, the information processing apparatus further includes a decoding unit and a data extraction unit as described in the following. The decoding unit is for generating decoded data from the detection result by the amplitude detection unit by performing a decoding process on the encoded signal based on a coding rule of the specific coding scheme. As such, when the encoded signal is decoded according to the coding rule of the specific coding scheme, the section of the transmission data is correctly decoded. On the other hand, the section of the header is not correctly decoded unless the coding cycle is changed. However, if the section of the transmission data is correctly extracted from the decoded data generated by the decoding unit, then it can be said that the transmission data is correctly decoded. Thus, the data extraction unit extracts, from the decoded data generated by the decoding unit, data of a section corresponding to the transmission data by referring to the beginning position of the transmission data detected by the header detection unit. According to this configuration, frame synchronization can be established without reducing transmission efficiency, and the transmission data can be extracted more surely.

Additionally, a bipolar code, an Alternate Mark Inversion (AMI) code with a duty of 100%, a partial response code, or the like, is used as the encoded data.

Furthermore, the main part of the technical idea according to the information processing apparatus is expressed as follows. The information processing apparatus is configured from a header adding unit for adding a header indicating a beginning position of data to transmission data, an encoding unit for encoding the transmission data to which the header is added by the header adding unit, according to a specific coding scheme, and generating encoded data expressed by mutually different first and second bit values, a cycle changing unit for changing a coding cycle in a section of the header by controlling the encoding unit, and an encoded data transmitting unit for transmitting the encoded data generated by the encoding unit under a control of the cycle changing unit. The previous expression assumed a multilevel signal. However, the expression shown here is altered such that the mode of the signal is more generalized, and the technical feature of the present embodiment is made clearer. However, a superior effect can be obtained with regard to the circuit scale and the power consumption when using the mode that uses the above-described multilevel signal.

REMARKS

The encoder 164 is an example of the encoding unit, the cycle changing unit and the line coding unit. Also, the driver 160 is an example of the signal transmitting unit and the encoded data transmitting unit. Also, the receiver 172 is an example of the signal receiving unit and an encoded data receiving unit. Furthermore, the decoder 182 is an example of the amplitude detection unit and the decoding unit. Also, the frame synchronization unit 184 is an example of the coding rule violation detection unit and the header detection unit. Also, the line decoding unit 176 is an example of the data extraction unit. Also, the frame generation unit 162 is an example of the header adding unit.

It should be understood by those skilled in the art that various modifications, combinations, sub-combinations and alterations may occur depending on design requirements and other factors insofar as they are within the scope of the appended claims or the equivalents thereof.

For example, the multilevel code of the new scheme for which the AMI code serves as a base is taken as an example in the above description. However, the technology of the present embodiment can be applied to a multilevel code for which a partial response code having the same type of characteristics as the AMI code serves as a base. Furthermore, it can also be applied to various types of partial response codes expressed as $PR(1,-1), PR(1,0,-1), PR(1,0,0,-1), PR(1,0,\ldots,0,-1)$, and the like.

The present application contains subject matter related to that disclosed in Japanese Priority Patent Application JP 2009-120712 filed in the Japan Patent Office on May 19, 2009, the entire content of which is hereby incorporated by reference.

What is claimed is:

1. An information processing apparatus comprising:
   a line coding unit for generating encoded data, wherein the line coding unit comprises a frame generation unit and an encoder,
   wherein the frame generation unit generates a transmission frame by adding, to transmission data, a header indicating a beginning position of the transmission data,
   wherein the encoder encodes the transmission frame generated by the frame generation unit according to a specific coding scheme, and generates the encoded data expressed by mutually different first and second bit values, wherein the encoder comprises a cycle switching unit for changing a coding cycle in a header section by controlling the encoder, and wherein the first bit value is expressed in a form of a plurality of first amplitude levels and the second bit value is expressed in a form of a plurality of second amplitude levels different from the first amplitude levels, wherein the polarities of the first and second amplitude levels are inverted every half cycle of a clock.

2. The information processing apparatus according to claim 1, wherein the frame generation unit generates the transmission frame by adding the header having a specific bit length to the transmission data regardless of a bit length of the transmission data.

3. The information processing apparatus according 1, further comprising:
- a signal transmitting unit for transmitting the encoded data generated by the encoder;
- a signal receiving unit for receiving the encoded data transmitted by the signal transmitting unit; and
- a line decoding unit for decoding the received encoded data.

4. The information processing apparatus according to claim 3, wherein the line decoding unit comprises:
- a decoder for generating decoded data from the detection result by an amplitude detection unit by performing a decoding process on the received encoded data based on a coding rule of the specific coding scheme; and
- a frame synchronization unit comprising a header detection unit for detecting the beginning position of the transmission data based on a position of an amplitude pattern,
- wherein the decoder comprises a data extraction unit for extracting data of a section corresponding to the transmission data by referring to the beginning position of the transmission data detected by the header detection unit.

5. The information processing apparatus according to claim 4, wherein the encoded data is a bipolar code, an Alternate Mark Inversion (AMI) code with a duty of 100%, or a partial response code.

6. An information processing apparatus comprising:
- a header adding unit for adding a header indicating a beginning position of data to transmission data;
- an encoding unit for encoding the transmission data to which the header is added by the header adding unit, according to a specific coding scheme, and generating encoded data expressed by mutually different first and second bit values;
- a cycle changing unit for changing a coding cycle in a section of the header by controlling the encoding unit; and
- an encoded data transmitting unit for transmitting the encoded data generated by the encoding unit under a control of the cycle changing unit.

7. The information processing apparatus according to claim 6, further comprising:
- an encoded data receiving unit for receiving the encoded data transmitted by the encoded data transmitting unit;
- a coding rule violation detection unit for detecting a coding rule violation under the specific coding scheme from the encoded data received by the encoded data receiving unit; and
- a header detection unit for detecting a position of the header based on a position of the coding rule violation detected by the coding rule violation detection unit.

8. An encoding method comprising the steps of:
- generating a transmission frame by adding, to transmission data, a header indicating a beginning position of the transmission data;
- encoding, while changing a coding cycle between a section of the header and a section of the transmission data, the transmission frame generated in the step of generating the transmission frame according to a specific coding scheme, and generating encoded data expressed by mutually different first and second bit values; and
- performing line coding on the encoded data generated in the step of encoding, and generating an encoded signal which expresses the first bit value in a form of a plurality of first amplitude levels and the second bit value in a form of a plurality of second amplitude levels different from the first amplitude levels, wherein the polarities of the first and second amplitude levels are inverted every half cycle of a clock.

9. An encoding method comprising the steps of:
- adding a header indicating a beginning position of data to transmission data; and
- encoding, according to a specific coding scheme, the transmission data to which the header is added in the step of adding the header while changing a coding cycle between a section of the header and a section of the transmission data, and generating encoded data expressed by mutually different first and second bit values.

10. A frame synchronization method comprising the steps of:
- adding a header indicating a beginning position of data to transmission data;
- encoding, according to a specific coding scheme, the transmission data to which the header is added in the step of adding the header while changing a coding cycle between a section of the header and a section of the transmission data, and generating encoded data expressed by mutually different first and second bit values;
- transmitting the encoded data generated in the step of encoding;
- receiving the encoded data transmitted in the step of transmitting;
- detecting a coding rule violation under the specific coding scheme from the encoded data received in the step of receiving; and
- detecting a position of the header based on a position of the coding rule violation detected in the step of detecting.

* * * * *